(12) United States Patent
Nishiguchi et al.

(10) Patent No.: US 11,341,105 B2
(45) Date of Patent: May 24, 2022

(54) INFORMATION PROCESSING APPARATUS AND INFORMATION PROCESSING METHOD

(71) Applicant: FUJITSU LIMITED, Kawasaki (JP)

(72) Inventors: Naoki Nishiguchi, Kawasaki (JP); Miwa Okabayashi, Sagamihara (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 16/358,794

(22) Filed: Mar. 20, 2019

(65) Prior Publication Data
US 2019/0303355 A1    Oct. 3, 2019

(30) Foreign Application Priority Data

Apr. 2, 2018 (JP) .............................. JP2018-071064

(51) Int. Cl.
*G06F 16/215* (2019.01)
*G06F 16/28* (2019.01)
*G06F 16/2455* (2019.01)

(52) U.S. Cl.
CPC ...... *G06F 16/215* (2019.01); *G06F 16/24564* (2019.01); *G06F 16/284* (2019.01)

(58) Field of Classification Search
CPC ................................................. G06F 16/90335
See application file for complete search history.

(56) References Cited

U.S. PATENT DOCUMENTS

| | | | | |
|---|---|---|---|---|
| 4,288,658 A | * | 9/1981 | Bieber | H04L 12/50 178/3 |
| 5,347,652 A | | 9/1994 | Epstein et al. | |
| 2011/0040824 A1 | | 2/2011 | Harm | |
| 2018/0084074 A1 | * | 3/2018 | Juneja | G06F 16/951 |

FOREIGN PATENT DOCUMENTS

| | | |
|---|---|---|
| JP | 05-189490 | 7/1993 |
| JP | 2003-150465 | 5/2003 |
| JP | 2015-158923 | 9/2015 |

OTHER PUBLICATIONS

JPOA—Office Action of Japanese Patent Application No. 2018-071064 dated Jan. 4, 2022 with Machine Translation.

* cited by examiner

*Primary Examiner* — William Spieler
(74) *Attorney, Agent, or Firm* — Fujitsu Patent Center

(57) ABSTRACT

An information processing apparatus includes one or more memories and one or more processors coupled to the one or more memories and the one or more processors configured to execute a first process by using first input information for a first terminal, perform first output of a first execution result generated by the first process executed by using the first input information, and in a case where a second terminal and the first terminal belong to a first group, perform second output of the first execution result in response to receiving a request of the first process to be executed by using second input information for the second terminal.

11 Claims, 29 Drawing Sheets

FIG. 1
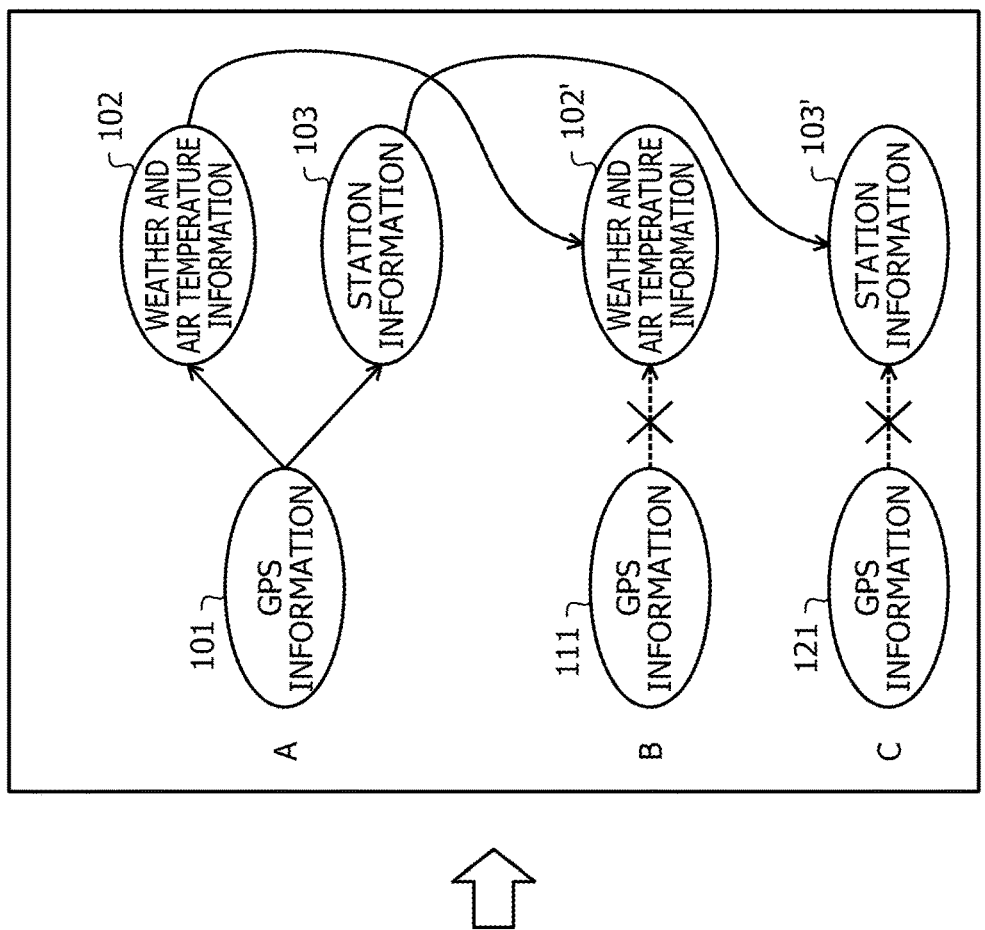
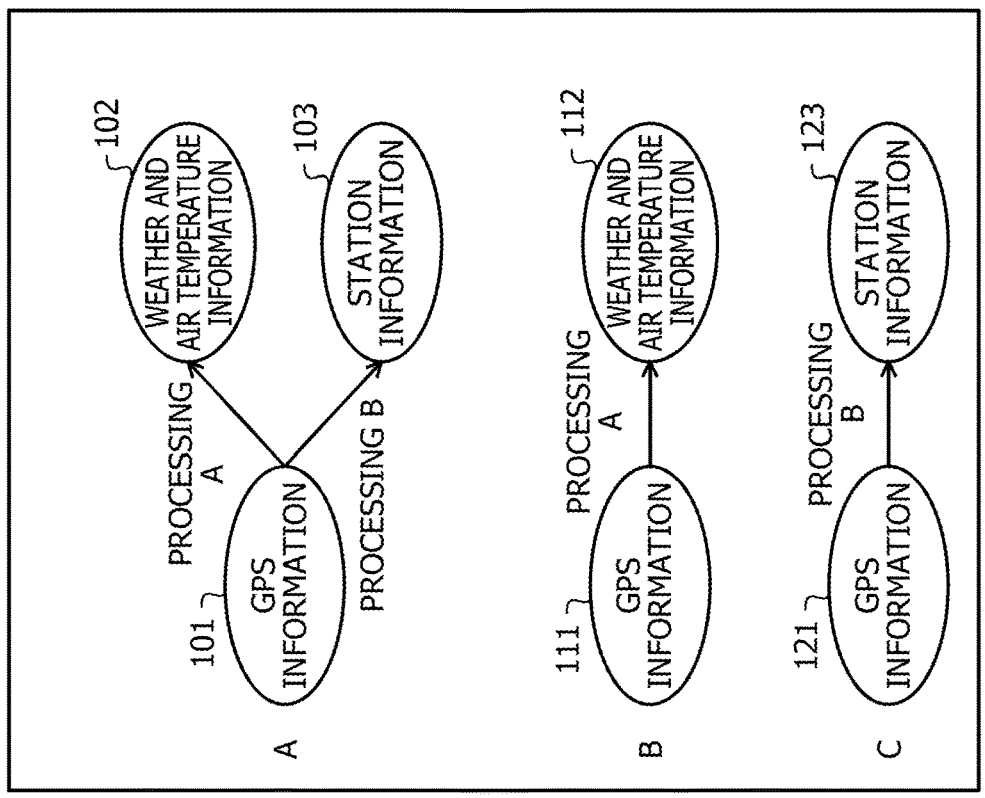

FIG. 4

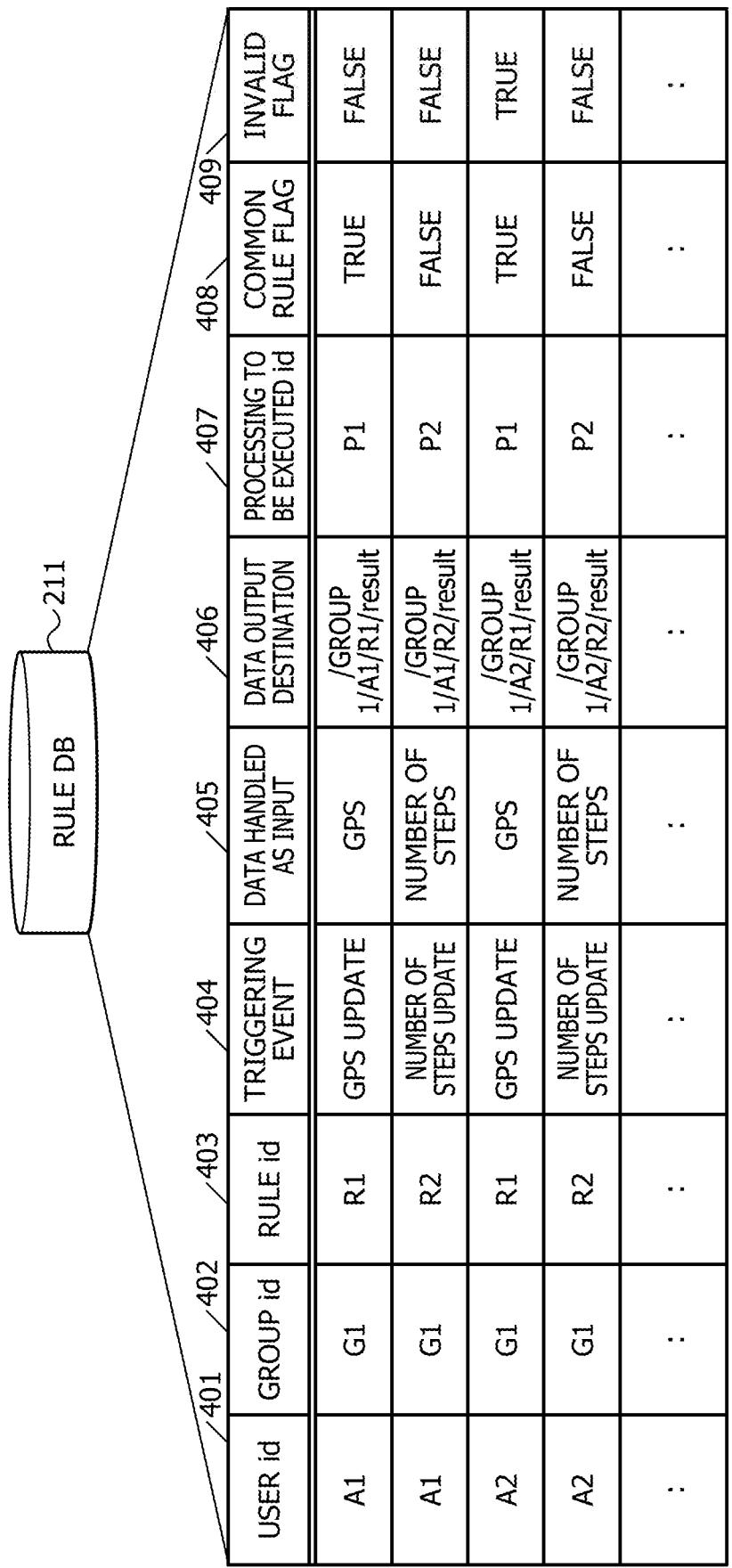

RULE DB 211

| USER id 401 | GROUP id 402 | RULE id 403 | TRIGGERING EVENT 404 | DATA HANDLED AS INPUT 405 | DATA OUTPUT DESTINATION 406 | PROCESSING TO BE EXECUTED id 407 | COMMON RULE FLAG 408 | INVALID FLAG 409 |
|---|---|---|---|---|---|---|---|---|
| A1 | G1 | R1 | GPS UPDATE | GPS | /GROUP 1/A1/R1/result | P1 | TRUE | FALSE |
| A1 | G1 | R2 | NUMBER OF STEPS UPDATE | NUMBER OF STEPS | /GROUP 1/A1/R2/result | P2 | FALSE | FALSE |
| A2 | G1 | R1 | GPS UPDATE | GPS | /GROUP 1/A2/R1/result | P1 | TRUE | TRUE |
| A2 | G1 | R2 | NUMBER OF STEPS UPDATE | NUMBER OF STEPS | /GROUP 1/A2/R2/result | P2 | FALSE | FALSE |
| .. | .. | .. | .. | .. | .. | .. | .. | .. |

PROCESSING DEPENDENCY RELATION DB 214

| PROCESSING id 701 | INPUT 702 | OUTPUT 703 | EXTERNAL RESOURCE 704 | COMMONIZABLE FLAG 705 |
|---|---|---|---|---|
| P1 | GPS | WEATHER | REFER | TRUE |
| P2 | GPS | AIR TEMPERATURE | REFER | TRUE |
| P3 | GPS | WEATHER | REFER CHANGE | FALSE |
| P4 | GPS | TOTAL NUMBER OF STEPS | REFER CHANGE | FALSE |
| .. | NUMBER OF STEPS | .. | .. | .. |

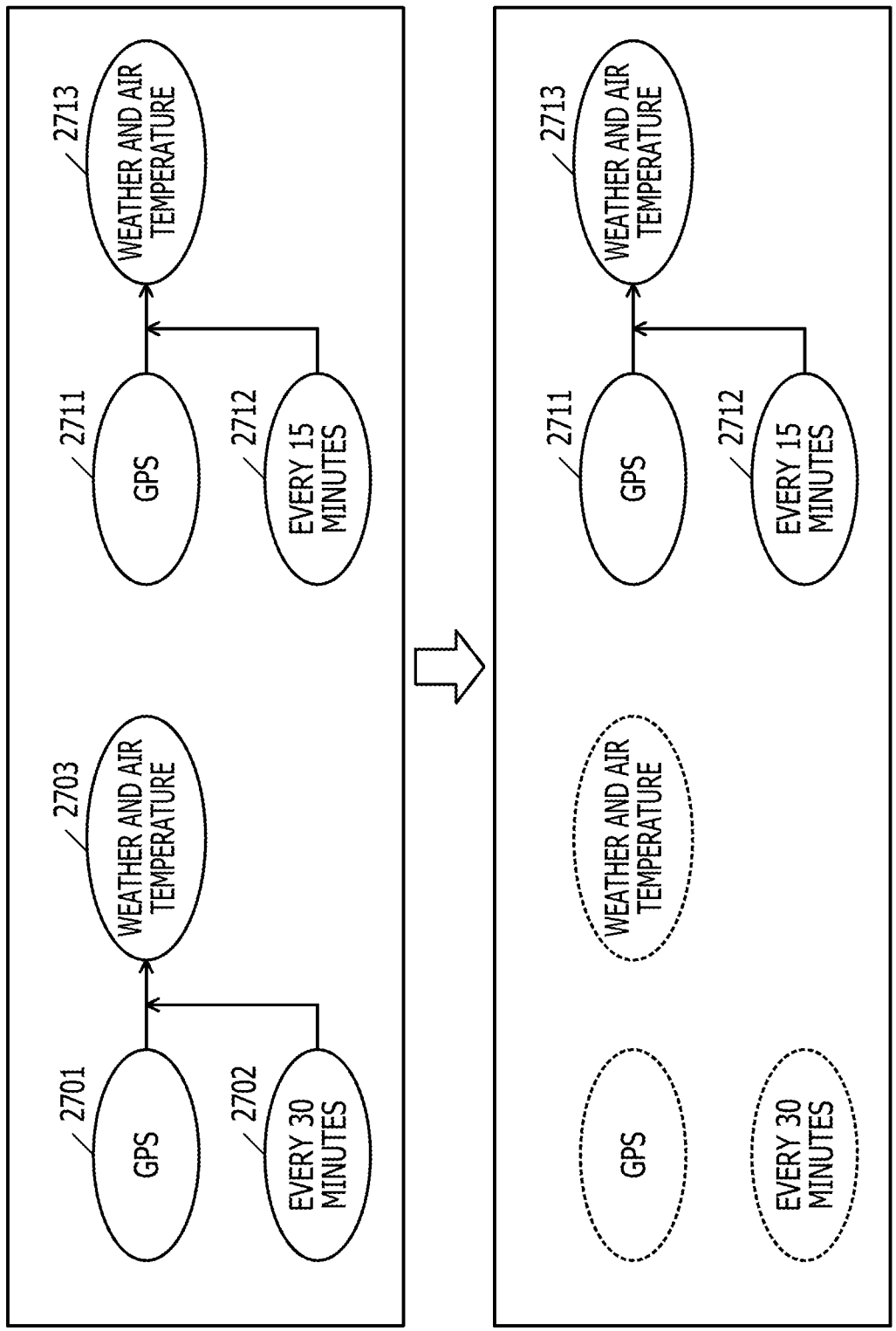

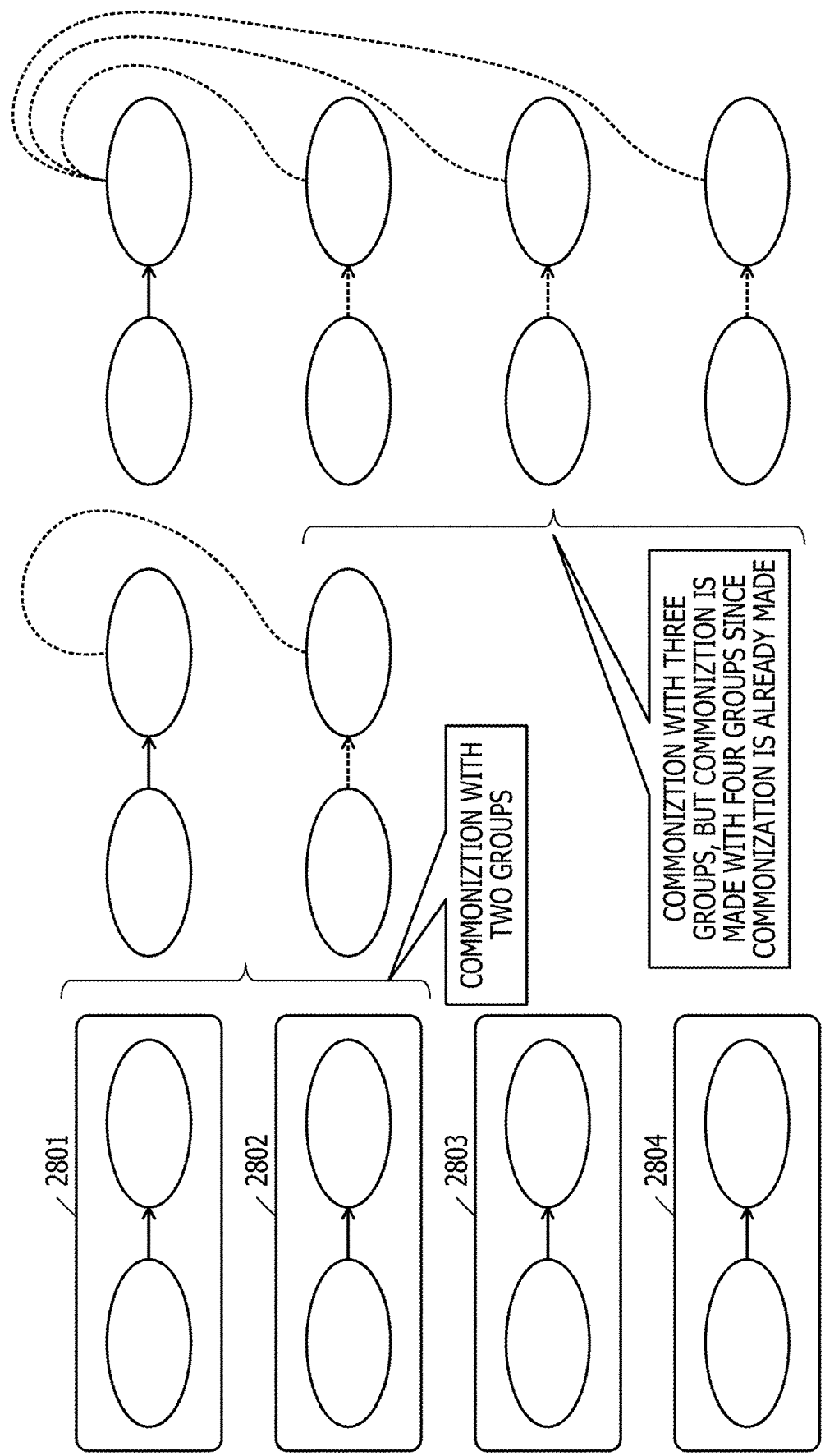

ively and explanatory and are not restrictive of the invention.
INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2018-71064, filed on Apr. 2, 2018, the entire contents of which are incorporated herein by reference.

FIELD

The embodiment discussed herein is related to an information processing technology.

BACKGROUND

In the related art, a service that executes a function (processing) by event driven is widely provided.

As the related art, there is a technique in which a plurality of users shares a macro or data processing and an intermediate result are managed.

For example, Japanese Laid-open Patent Publication No. 2015-158923 and Japanese Laid-open Patent Publication No. 05-189490 disclose the related art.

SUMMARY

According to an aspect of the embodiments, an information processing apparatus includes one or more memories and one or more processors coupled to the one or more memories and the one or more processors configured to execute a first process by using first input information for a first terminal, perform first output of a first execution result generated by the first process executed by using the first input information, and in a case where a second terminal and the first terminal belong to a first group, perform second output of the first execution result in response to receiving a request of the first process to be executed by using second input information for the second terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram illustrating an example of an outline of an information processing apparatus, an information processing system, and an information processing program according to the embodiment;

FIG. 4 is an explanatory diagram illustrating an example of a data configuration of a rule DB;

FIG. 27 is an explanatory diagram illustrating another example (No. 2) relating to "input"; and FIG. 28 is an explanatory diagram illustrating another example relating to rule registration.

DESCRIPTION OF EMBODIMENTS

Figure 2:
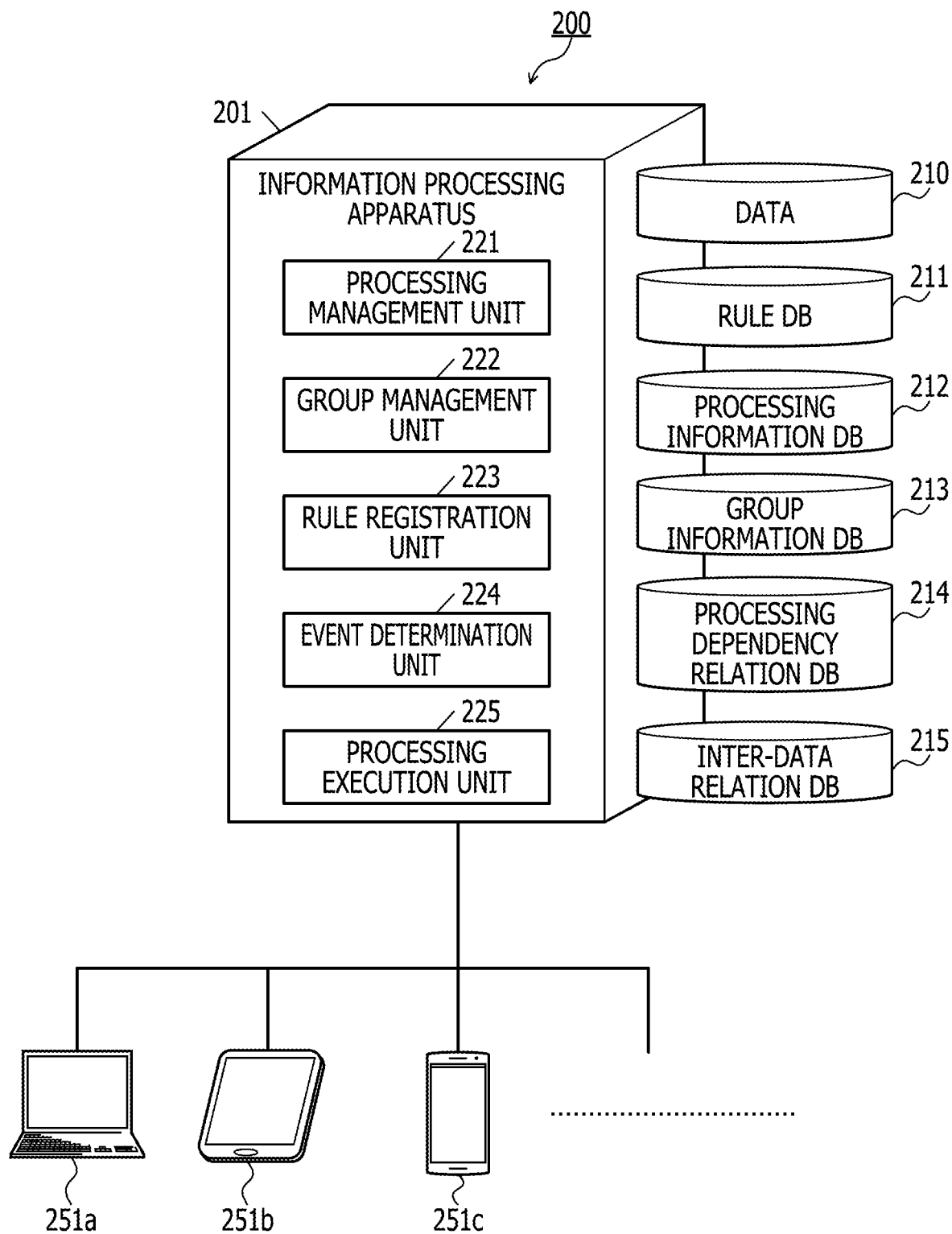
FIG. 2 is a block diagram illustrating an example of a system configuration of an information processing system.

However, in the related art, since the same processing is executed a lot of times when there are many people receiving the service, there is a problem that wasteful use of resources is increased.

Hereinafter, an embodiment of an information processing apparatus, an information processing system, and an information processing program according to the embodiment will be described in detail with reference to drawings.

Embodiment

Outline of Information Processing System 200

FIG. 1 is an explanatory diagram illustrating an example of the outline of the information processing apparatus, the information processing system, and the information processing program according to the embodiment.

In a figure on the left side of FIG. 1, a user "A" executes processing A with GPS information 101 to output weather/air temperature information 102. The "output" is to acquire and record an execution result of the processing (weather/air temperature information 102). The user "A" executes processing B with the GPS information 101 to output station information 103. A user "B" executes the processing A with GPS information 111 to output weather/air temperature information 112. A user "C" executes the processing B with GPS information 121 to output station information 123.

Even when contents of the GPS information 101 of the user "A", the GPS information 111 of the user "B", and the GPS information 121 of the user "C" are respectively the same, the pieces of processing are separately executed. Since the contents of the GPS information 101, the GPS information 111, and the GPS information 121 which are the inputs are the same and the contents of the pieces of processing are also the same, the outputs, for example, the weather/air temperature information 102 and the weather/air temperature information 112 have the same contents and the station information 103 and the station information 123 also have the same contents.

From this, it is understood that the same processing A and the same processing B are respectively executed twice by the three users "A", "B", and "C". Therefore, it may be said that one processing A and one processing B are not desired. It may be said that resources are wasted by that amount.

As illustrated in a figure on the right side of FIG. 1, it is possible to not execute the processing A which is originally requested to be executed by the user "B" by setting the weather/air temperature information 102 which is the output of the processing A executed by the user "A" as the output (weather/air temperature information "102") of the user "B". In order to set the output of the user "A" as the output of the user "B", for example, information on the output of the user "A" may be copied to an output destination of the user "B". The output destination of the user "B" may be set as the output destination of the user "A". In any case, it is possible for the user "B" to obtain the execution result without executing the processing A.

Similarly, it is possible to not execute the processing B which is originally requested to be executed by the user "C" by setting the station information 103 which is the output of the processing B executed by the user "A" as the output (station information "103") of the user "C".

In this manner, in a case where it is known that the users are in the same place, it is possible to integrate the pieces of processing since the same processing result is obtained even with the separate pieces of GPS information. For example, when it is known that the users are in the same situation from now on and the pieces of processing under the situation are registered, it is possible to specify that which inputs are the same and it is an opportunity to integrate the pieces of processing.

For example, in a situation where people are in the same train, the movement of the train is common to the people in the train and a place is also common (detailed contents will be described in Example 1 described below). In a situation of participating in a bus tour, the movement is also the same (detailed contents will be described in Example 2 described below).

Therefore, an event and a function (processing) are managed in units of person. When new processing is registered for a plurality of people, it is possible to reduce redundantly executed processing by using the fact that an event and an input assumed in the processing are the same.

System Configuration of Information Processing System 200

FIG. 2 is a block diagram illustrating an example of the system configuration of the information processing system 200. In FIG. 2, the information processing system 200 includes an information processing apparatus 201. The information processing apparatus 201 has data 210 to be referred and written when executing the processing. The information processing apparatus 201 may be configured to be connected to the data 210 through a network.

The information processing apparatus 201 has various databases (a rule database (DB) 211, a processing information database (DB) 212, a group information database (DB) 213, a processing dependency relation database (DB) 214, and an inter-data relation database (DB) 215). The information processing apparatus 201 does not have the rule DB 211, the processing information DB 212, the group information DB 213, the processing dependency relation DB 214 or the inter-data relation DB 215 or any combination thereof. Instead, the information processing apparatus 201 may be configured so as to be connected to the various databases 211 to 215 through a network or the like which is not illustrated in FIG. 2.

The information processing apparatus 201 has each of configuration units of a processing management unit 221, a group management unit 222, a rule registration unit 223, an event determination unit 224, and a processing execution unit 225, and the like. A control unit of the information processing apparatus 201 may be configured of each of the configuration units 221 to 225. Detailed contents of each of the configuration units 221 to 225 will be described below.

The information processing apparatus 201 is connected to a user terminal apparatus 251 through the network which is not illustrated in FIG. 2. The user terminal apparatus 251 may be realized by, for example, the information processing apparatus such as a personal computer 251a, a tablet terminal apparatus 251b, or a smartphone 251c.

The user terminal apparatus 251 (251a to 251c) has a CPU, a memory, a display, an input apparatus, a communication apparatus, and the like. Various functions such as the input, the output, and the communication of the information may be realized by the user terminal apparatus 251.

Hardware Configuration Example of Information Processing Apparatus

Figure 3:
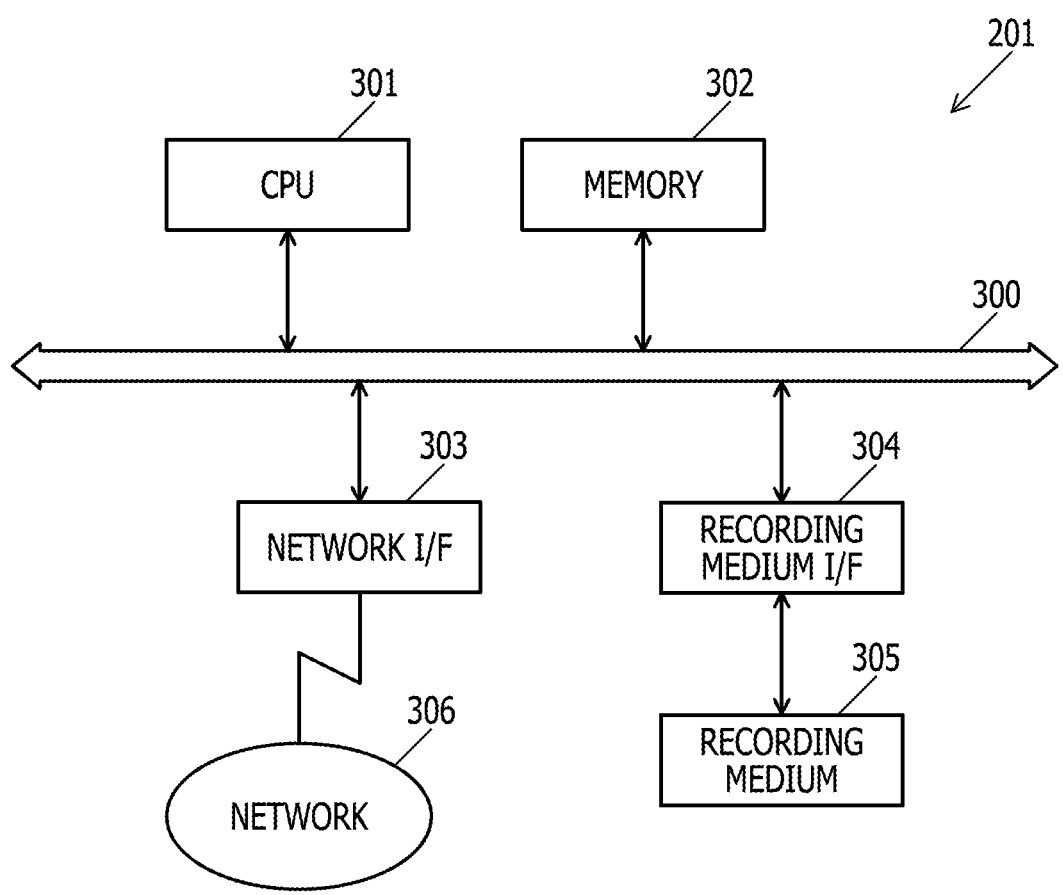
FIG. 3 is a block diagram illustrating an example of a hardware configuration of an information processing apparatus.

FIG. 3 is a block diagram illustrating an example of the hardware configuration of the information processing apparatus 201. A server (for example, a server 1500 illustrated in FIG. 15, a server 2100 illustrated in FIG. 21, and the like described below) which is an example of the information processing apparatus 201 has a central processing unit (CPU) 301, a memory 302, a network interface (I/F) 303, a recording medium I/F 304, and a recording medium 305. Each of the configuration units 301 to 304 is respectively connected to each other by a bus 300.

The CPU 301 controls the entire information processing apparatus 201. The memory 302 has, for example, a read only memory (ROM), a random access memory (RAM), a flash ROM, and the like. For example, the flash ROM and the ROM store various programs, and the RAM is used as a work area of the CPU 301. The program stored in the memory 302 is loaded on the CPU 301 to cause the CPU 301 to execute coded processing.

The network I/F 303 is connected to a network 306 through a communication line and is connected to another apparatus (for example, another server, a user terminal apparatus, a database, or another system) through the network 306. The network I/F 303 controls an interface between the network 306 and the inside of the information processing apparatus 201 and controls the input and output of the data from another apparatus. For example, a modem, a LAN adapter, or the like may be employed as the network I/F 303.

The recording medium I/F 304 controls the reading and writing of the data from and to the recording medium 305 according to the control of the CPU 301. The recording medium 305 stores the data written by the control of the recording medium I/F 304. Examples of the recording medium 305 are a magnetic disk and an optical disk.

The information processing apparatus 201 may have, for example, a solid state drive (SSD), a keyboard, a pointing device, the display, and the like (not illustrated) in addition to the configuration units 301 to 305 described above.

Contents of Rule DB 211

FIG. 4 is an explanatory diagram illustrating an example of a data configuration of the rule DB 211. In FIG. 4, the rule DB 211 is registered by the rule registration unit 223 and is a database (table) used when the event determination unit 224 determines an event. The rule DB is managed for each user. In Example described below, a rule is registered for each terminal.

As illustrated in FIG. 4, the rule DB 211 has, for example, a "user id" column 401, a "group id" column 402, a "rule id" column 403, a "triggering event" column 404, a "data handled as input" column 405, a "data output destination" column 406, a "processing to be executed id" column 407, a "common rule flag" column 408, and an "invalid flag" column 409. The information is stored in a field formed by each of the item columns 401 to 409 to register the rule as a record.

The rule DB 211 may realize its function by, for example, the recording medium 305 illustrated in FIG. 3. The network I/F 303 illustrated in FIG. 3 may perform the input and output of the data with respect to a predetermined database connected through the network 306 to realize the function of the rule DB 211.

The "user id" column 401 stores an id uniquely provided for each user. The "group id" column 402 stores an id uniquely provided for each group. The "rule id" column 403 stores an id uniquely provided for each rule. The "triggering event" column 404 stores information on an event which is a trigger of the processing. The triggering event is, for example, "change in the GPS information", "increase in the number of steps", or the like. A predetermined operation of the user terminal apparatus 251 or the like may also be the triggering event.

Figure 7:
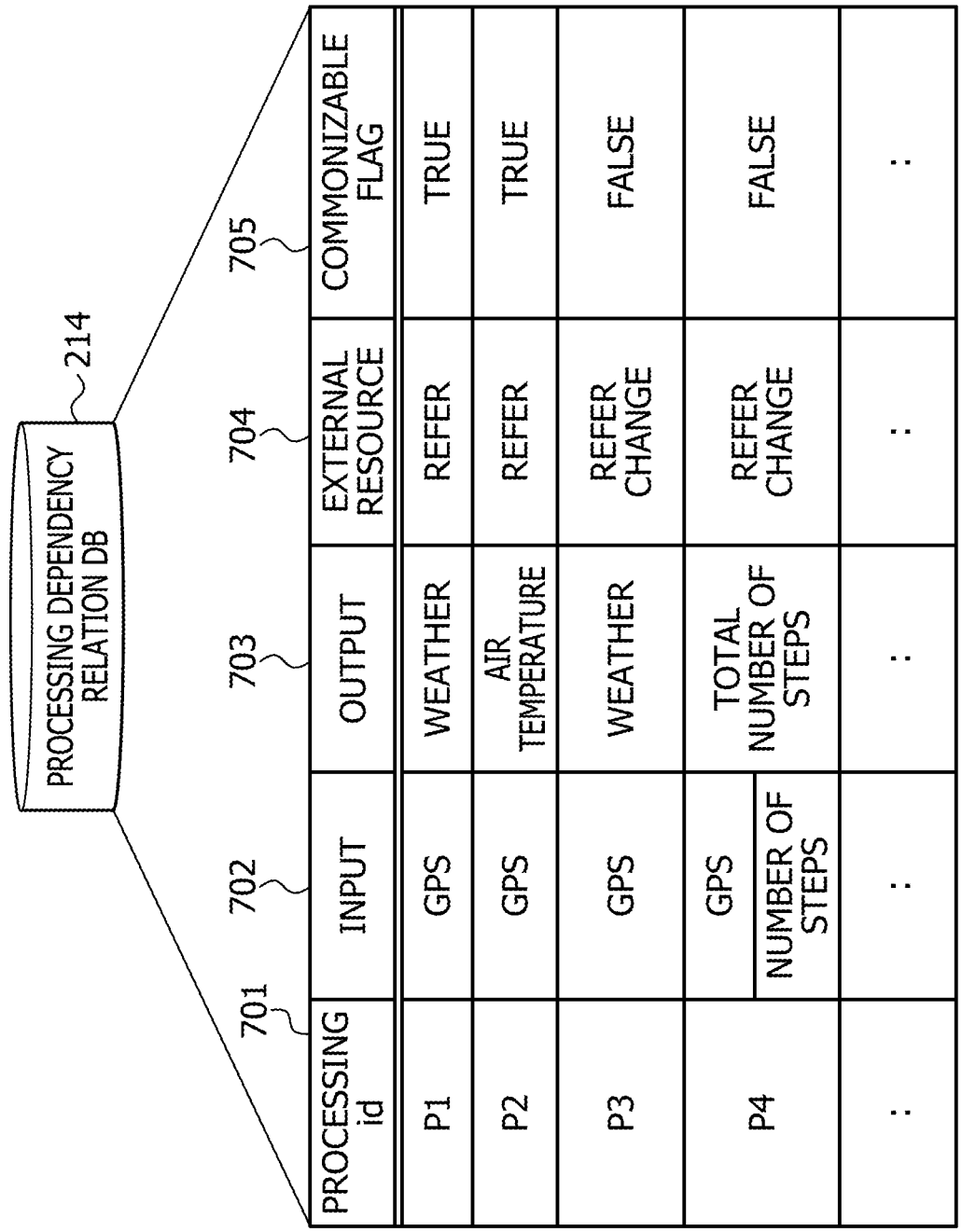
FIG. 7 is an explanatory diagram illustrating an example of a data configuration of a processing dependency relation DB.

The "data handled as input" column 405 stores the data handled as the input. For example, the data handled as the input is the GPS information or the like. The "data output destination" column 406 stores information (file path or the like) on the output destination to which the data on the execution result of the processing executed is output. In the "processing to be executed id" column 407, information on processing id of the processing related to the rule is input. The same id as the processing id stored in a "processing id" column 501 of a processing information DB 212 in FIG. 5 and a "processing id" column 701 of a processing dependency relation DB 214 in FIG. 7 is used for the processing id.

The "common rule flag" column 408 stores a flag indicating whether the rule is common to other rules. For example, the "common rule flag" column 408 stores "True" in a case where the rule is a common rule and stores "False" in a case where the rule is not a common rule.

The "invalid flag" column 409 stores a flag indicating whether the rule is a rule in which the processing executed in the rule is invalidated. The processing is not invalidated in a case of a rule performing the processing in the common rule and is invalidated in a case where a result processed by a rule of another user is used. For example, "True" is stored in the case of the rule related to the processing to be invalidated, and "False" is stored in the case of the rule related to the processing not to be invalidated. Therefore, in a rule in which "False" is stored in the "invalid flag" column 409, the processing related to the processing to be executed id is executed. On the other hand, in a rule in which "True" is stored in the "invalid flag" column 409, the processing related to the processing to be executed id is not executed.

In this manner, the triggering event, the data handled as the input, the data output destination, the processing to be executed id, the common rule flag, and the invalid flag are registered in the rule DB 211 for each rule. It is possible to access these pieces of information using "rule id".

Contents of Processing Information DB 212

Figure 5:
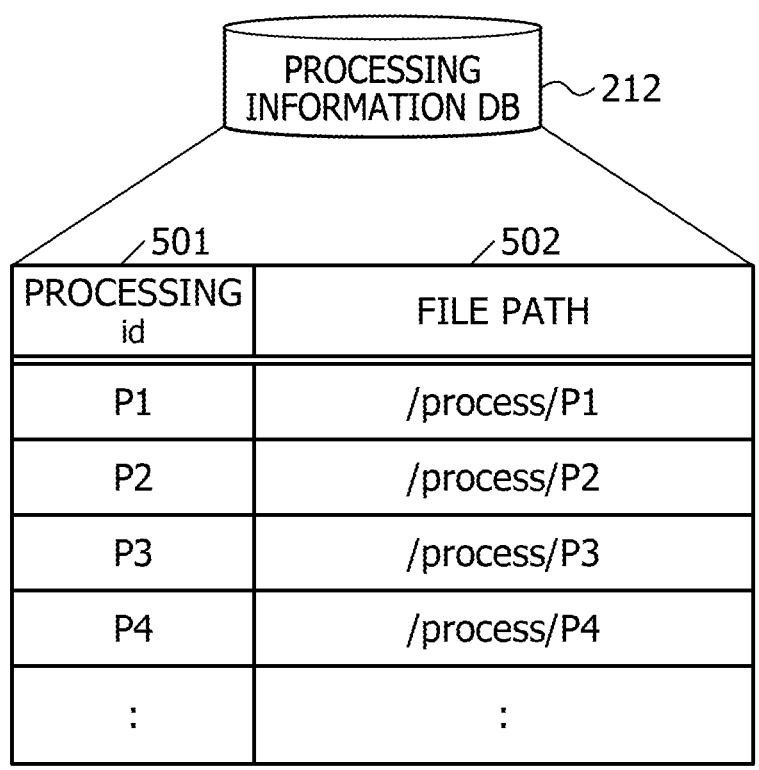
FIG. 5 is an explanatory diagram illustrating an example of a data configuration of a processing information DB.

FIG. 5 is an explanatory diagram illustrating an example of the data configuration of the processing information DB 212. In FIG. 5, the processing information DB 212 is a database that stores information on specific contents relating to "processing".

As illustrated in FIG. 5, the processing information DB 212 has, for example, the "processing id" column 501 and a "file path" column 502. The information is stored in a field formed by each of the item columns 501 and 502 to register the contents of processing as a record. The processing information DB 212 may realize its function by, for example, the recording medium 305 illustrated in FIG. 3 or the like. The network I/F 303 illustrated in FIG. 3 may perform the input and output of the data with respect to a predetermined database connected through the network 306 to realize the function of the processing information DB 212.

The "processing id" column 501 stores an id uniquely provided for each user. The "file path" column 502 stores information on a path where a data file of target processing is present for each piece of processing id.

In this manner, in the processing information DB 212, the file path is registered for each piece of processing. Therefore, it is possible to access the data file of the target processing using "processing id".

Contents of Group Information DB 213

Figure 6:
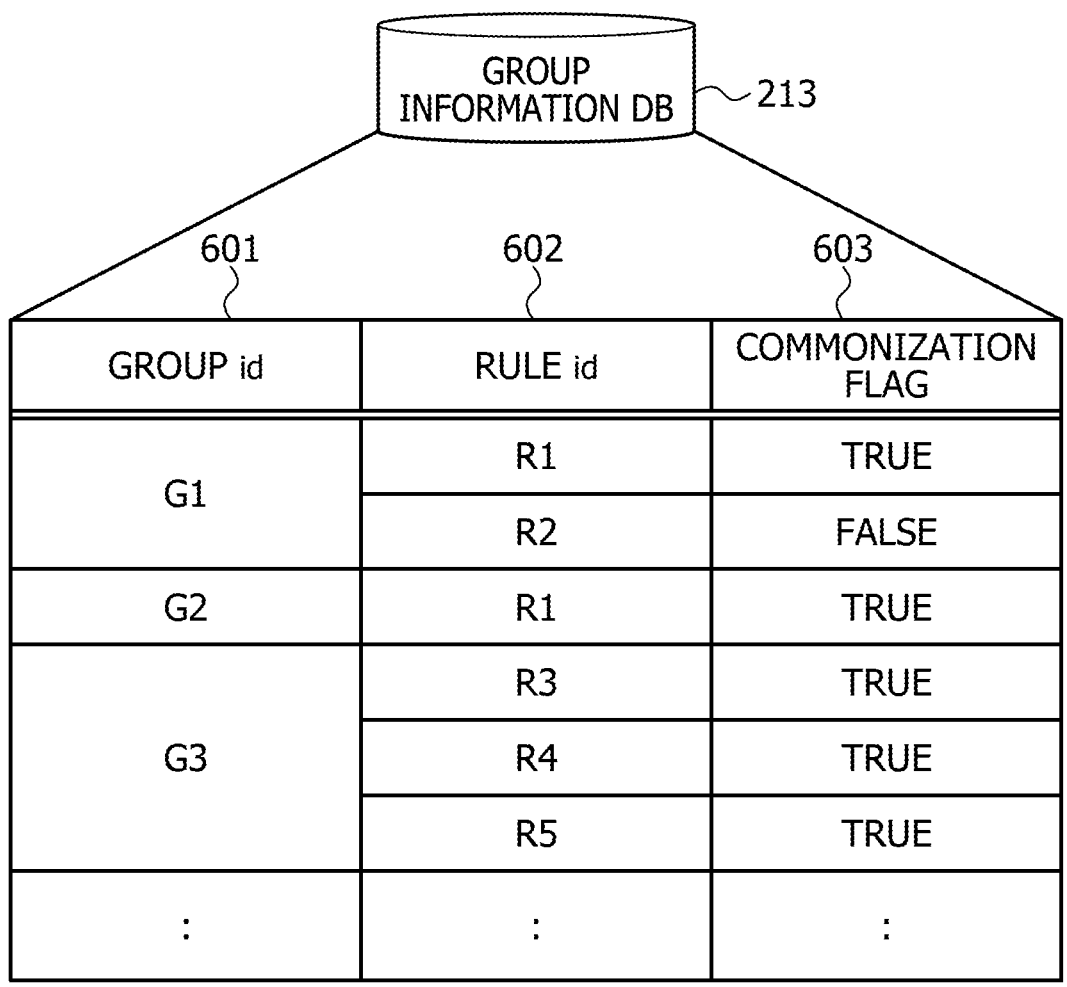
FIG. 6 is an explanatory diagram illustrating an example of a data configuration of a group information DB.

FIG. 6 is an explanatory diagram illustrating an example of the data configuration of the group information DB 213. In FIG. 6, the group information DB 213 is managed by the group management unit 222 and is a database (table) used when the rule registration unit 223 registers the rule. The group information DB 213 stores, for example, group information configured of the users.

As illustrated in FIG. 6, the group information DB 213 has, for example, a "group id" column 601, a "rule id" column 602, and a "commonization flag" column 603. The information is stored in a field formed by each of the item columns 601 to 603 to register the contents of a group as a record.

The group information DB 213 may realize its function by, for example, the recording medium 305 illustrated in FIG. 3. The network I/F 303 illustrated in FIG. 3 may perform the input and output of the data with respect to a predetermined database connected through the network 306 to realize the function of the group information DB 213.

The "group id" column 601 stores an id uniquely provided for each group. In the "rule id" column 602, an id which is uniquely provided for each rule and the same id as the id stored in the "rule id" column 403 is stored in a predetermined field. The "commonization flag" column 603 stores a flag indicating whether the commonization of a rule related to each rule id is possible with respect to a group related to the group id. "True" in a case where the commonization of each rule is possible with respect to the group and "False" in a case where the commonization of each rule is impossible are respectively stored in the "commonization flag" column 603.

In this manner, the rule id and the commonization flag are registered for each group in the group information DB 213. It is possible to extract only the rule capable of being commonized among the rules in the group with "group id" as a key.

Contents of Processing Dependency Relation DB 214

FIG. 7 is an explanatory diagram illustrating an example of the data configuration of the processing dependency relation DB 214. In FIG. 7, the processing dependency relation DB 214 is managed by the processing management unit 221 and is a database (table) used when the rule registration unit 223 registers the rule. The processing dependency relation DB 214 stores, for example, information on a dependency relation of "processing" such as input, output, external resource, and commonizable flag of "processing".

As illustrated in FIG. 7, the processing dependency relation DB 214 has, for example, the "processing id" column 701, an "input" column 702, an "output" column 703, an "external resource" column 704, and a "commonizable flag" column 705. The information is stored in a field formed by each of the item columns 701 to 705 to register the processing dependency relation as a record.

The processing dependency relation DB 214 may realize its function by, for example, the recording medium 305 illustrated in FIG. 3. The network I/F 303 illustrated in FIG. 3 may perform the input and output of the data with respect to a predetermined database connected through the network 306 to realize the function of the processing dependency relation DB 214.

The "processing id" column 701 stores an id which is uniquely provided for each piece of processing and the same id as the id stored in the "processing id" column 501. The "input" column 702 stores information on the input with respect to "processing id". The "output" column 703 stores information on the output with respect to "processing id". The "external resource" column 704 stores information indicating a relation with an external resource 210 with respect to "processing id". The "commonizable flag" column 705 stores information whether the commonization of processing related to "processing id" is possible. "True" in a case where the commonization of the processing is possible and "False" in a case where the commonization of the processing is impossible are respectively stored in the "commonizable flag" column 705.

In this manner, the input, the output, the external resource, and the commonizable flag are registered for each piece of "processing" in the processing dependency relation DB 214. Therefore, it is possible to access the information on the processing dependency relation of the target processing using "processing id".

Contents of Inter-Data Relation DB 215

Figure 8:
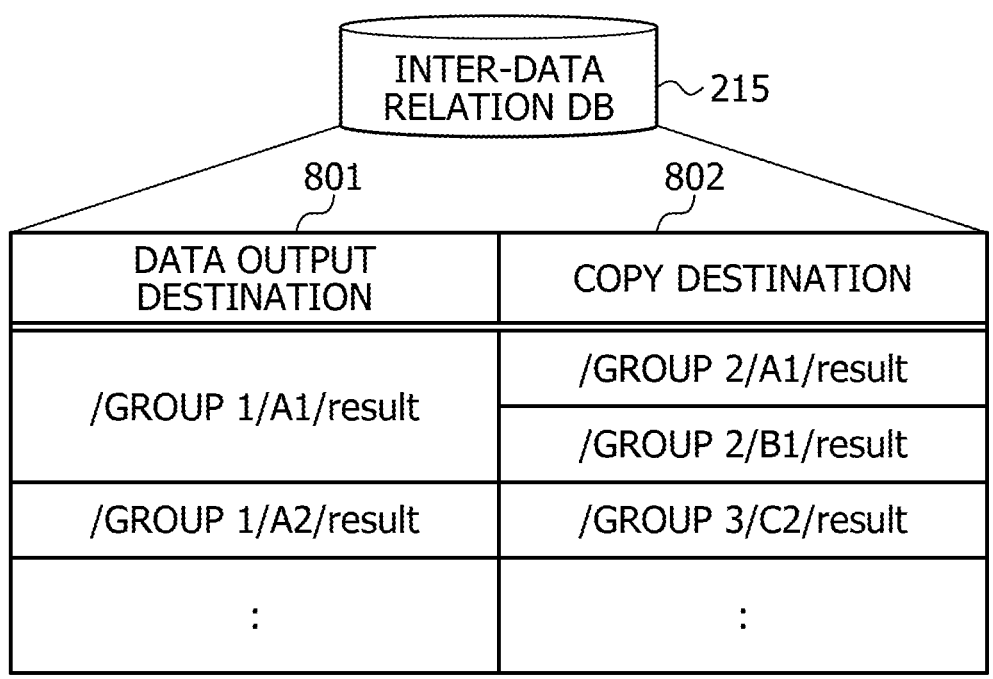
FIG. 8 is an explanatory diagram illustrating an example of a data configuration of an inter-data relation DB.

FIG. 8 is an explanatory diagram illustrating an example of the data configuration of the inter-data relation DB 215. In FIG. 8, the inter-data relation DB 215 is a database (table) in which an output destination of an execution result of each piece of "processing" and a copy destination of the execution result are registered.

As illustrated in FIG. 8, the inter-data relation DB 215 has, for example, a "data output destination" column 801 and a "copy destination" column 802. The information is stored in a field formed by each of the item columns 801 and 802 to register the inter-data relation as a record. The inter-data relation DB 215 may realize its function by, for example, the recording medium 305 illustrated in FIG. 3. The network I/F 303 illustrated in FIG. 3 may perform the input and output of the data with respect to a predetermined database connected through the network 306 to realize the function of the inter-data relation DB 215.

The "data output destination" column 801 stores information on a path to which the data is output. The "copy destination" column 802 stores information on a copy destination to which the data of the "data output destination" column 801 is copied. Therefore, since the execution of invalidated processing having the data output destination stored in the "copy destination" column 802 is impossible, it is possible to set the data stored in the "copy destination" column 802 as the execution result of the processing.

In this manner, in order to guarantee the execution result of the commonized and invalidated processing, the inter-data relation DB 215 sets the data output destination of the commonized and invalidated processing as the copy destination. On the contrary, the data output destination of the invalidated processing may be linked to an output destination where the processing is executed and the execution result is output to set the data stored in the output destination as the data of the output destination of the invalidated processing.

Functional Configuration Example of Information Processing System 200

Figure 9:
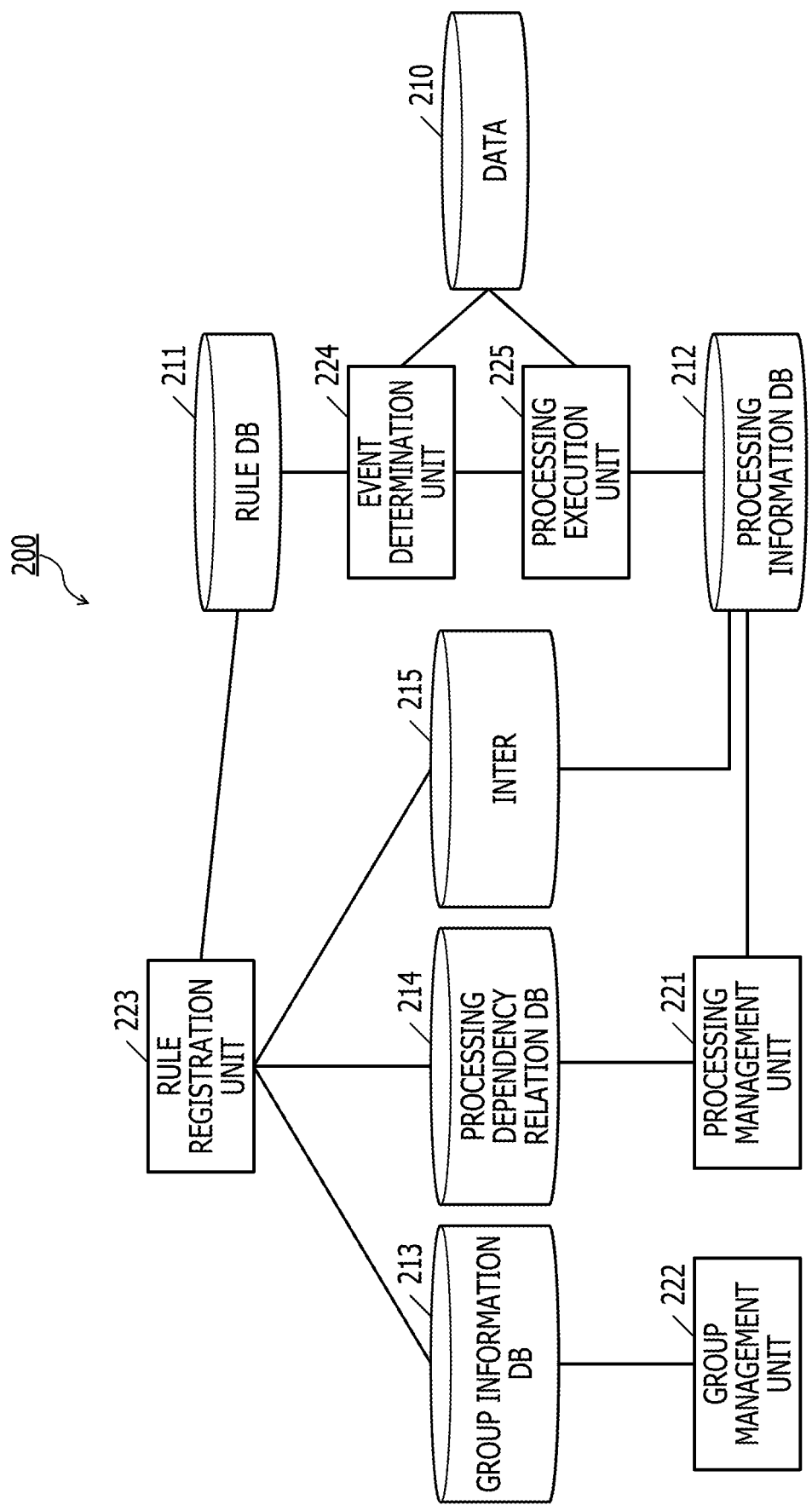
FIG. 9 is a block diagram illustrating an example of a functional configuration of the information processing system.

FIG. 9 is a block diagram illustrating an example of the functional configuration of the information processing system 200. In FIG. 9, the processing management unit 221 of the information processing apparatus 201 receives a processing file and the dependency relation of the processing and registers the processing in the processing information DB 212 and the processing dependency relation DB 214. The processing management unit 221 may realize its function, for example, by causing the CPU 301 to execute a program having a plurality of commands stored in the memory 302 illustrated in FIG. 3 or the like, or by the network I/F 303 or the like.

The group management unit 222 of the information processing apparatus 201 creates a group for collectively managing the rules in units of person and registers the group in the group information DB 213. The group management unit 222 may realize its function, for example, by causing the CPU 301 to execute the program having the plurality of commands stored in the memory 302 illustrated in FIG. 3 or the like, or by the network I/F 303 or the like.

The rule registration unit 223 of the information processing apparatus 201 performs processing of rule registration. The rule registration unit 223 of the information processing apparatus 201 acquires information on a designated group from the group information DB 213, determines whether the commonization of the rule to be registered is possible with reference to the processing dependency relation DB 214, and registers the commonized contents in the rule DB 211 and the inter-data relation DB 215. The rule registration unit 223 may realize its function, for example, by causing the CPU 301 to execute the program having the plurality of commands stored in the memory 302 illustrated in FIG. 3 or the like, or by the network I/F 303 or the like.

The event determination unit 224 performs processing of event determination based on an event trigger of the rule DB 211. The event determination unit 224 may realize its function by, for example, causing the CPU 301 to execute the program having the plurality of commands stored in the memory 302 illustrated in FIG. 3 or the like, or by the network I/F 303 or the like.

The processing execution unit 225 performs the processing with the rule triggered by the event determination unit 224 as an argument. The processing execution unit 225 may realize its function, for example, by causing the CPU 301 to execute the program having the plurality of commands stored in the memory 302 illustrated in FIG. 3 or the like, or by the network I/F 303 or the like.

Contents of Processing of Processing Management Unit 221

Figure 10:
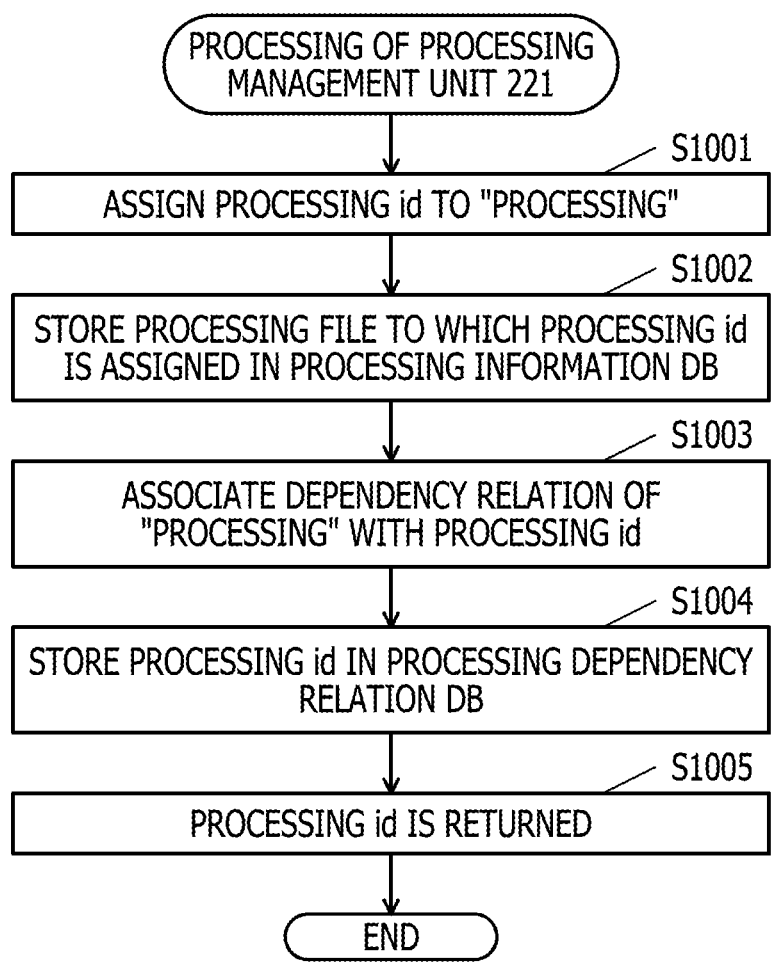
FIG. 10 is a flowchart illustrating an example of a procedure of processing of a processing management unit.

FIG. 10 is a flowchart illustrating an example of a procedure of the processing of the processing management unit 221. In the flowchart of FIG. 10, the processing management unit 221 first assigns the processing id to each piece of "processing" (step S1001). The processing file to which the processing id is assigned is stored in the processing information DB 212 (step S1002). For example, the file path indicating a location where the processing file is stored is registered for the processing id as illustrated in FIG. 5.

Next, the processing management unit 221 associates the information ("input", "output", "external resource", and "commonizable flag") on the dependency relation of each piece of "processing" with the processing id (step S1003). The information on the dependency relation of each piece of "processing" is stored in the processing dependency relation DB 214 for each piece of processing id (step S1004).

Thereafter, the processing id is returned (step S1005), and a series of pieces of processing ends. The processing management unit 221 performs the series of pieces of processing each time new "processing" occurs. The processing information DB 212 and the processing dependency relation DB 214 are created in this manner and updated.

Contents of Processing of Group Management Unit 222

Figure 11:
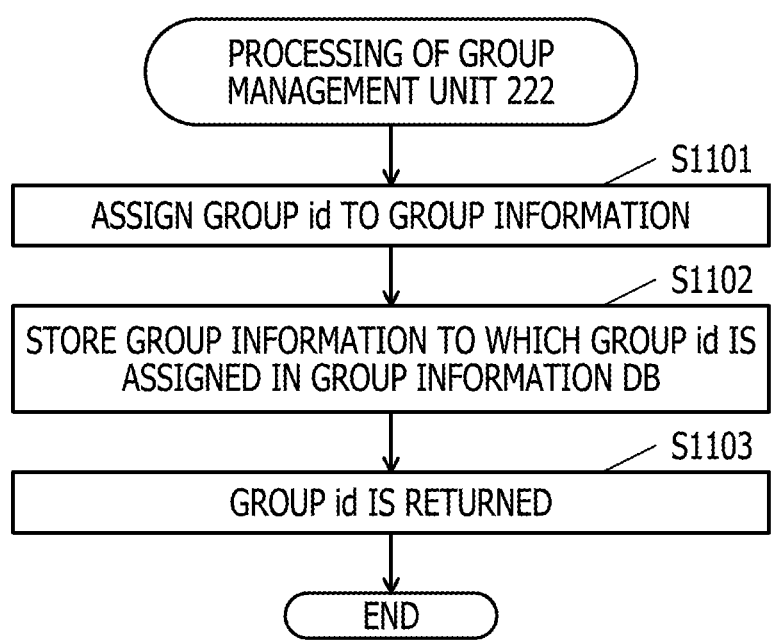
FIG. 11 is a flowchart illustrating an example of a procedure of processing of a group management unit.

FIG. 11 is a flowchart illustrating an example of a procedure of the processing of the group management unit 222. In the flowchart of FIG. 11, the group management unit 222 first assigns the group id to each piece of "group information" (step S1101). The group information to which the group id is assigned is stored in the group information DB 213 (step S1102).

Thereafter, the group id is returned (step S1103), and a series of pieces of processing ends. The group management unit 222 performs the series of pieces of processing each time new "group information" is generated. The group information DB 213 is created in this manner and updated.

Contents of Processing of Rule Registration Unit 223

Figure 12A:
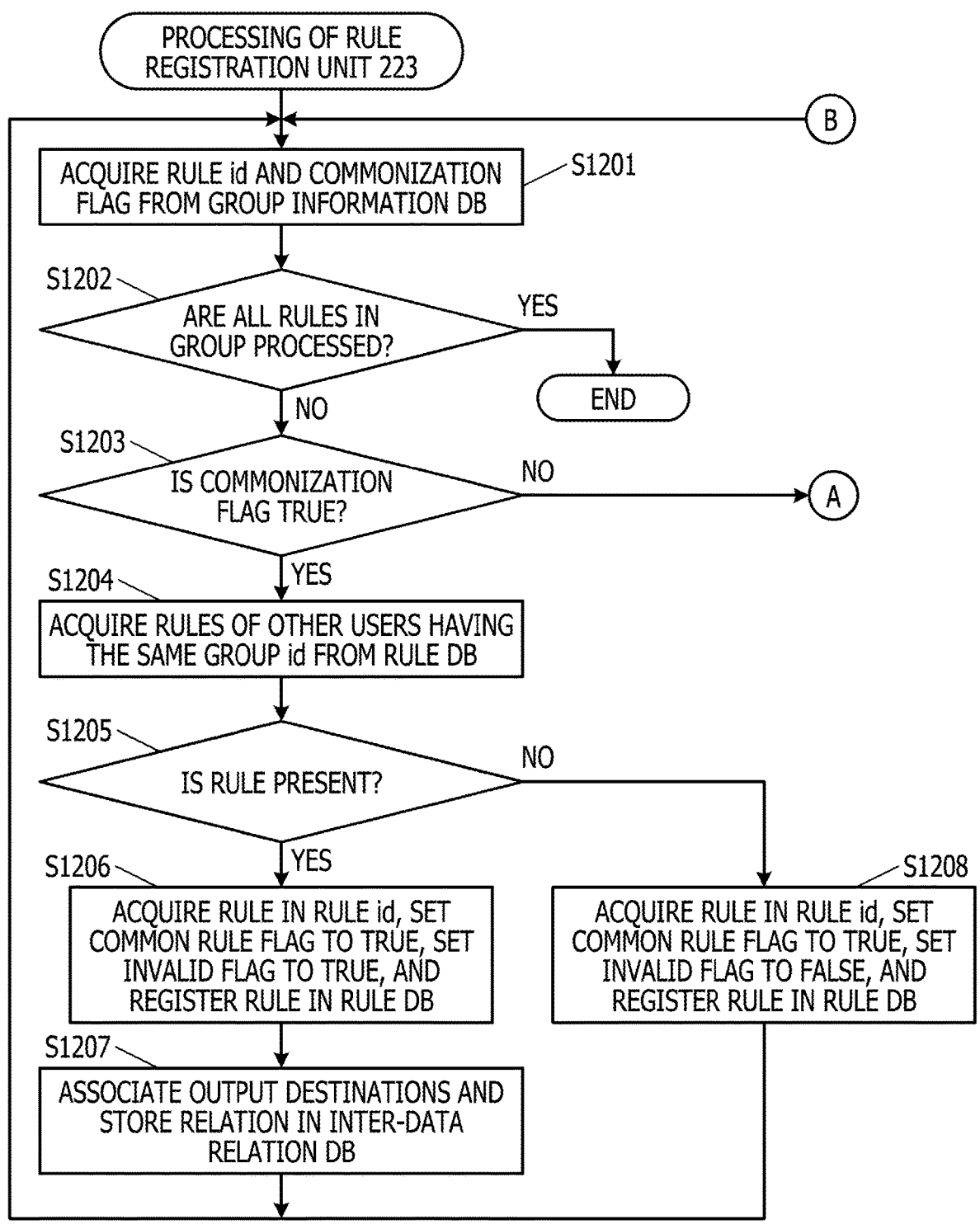
FIGS. 12A and 12B are flowcharts illustrating an example of a procedure of processing of a rule registration unit.
Figure 12B:
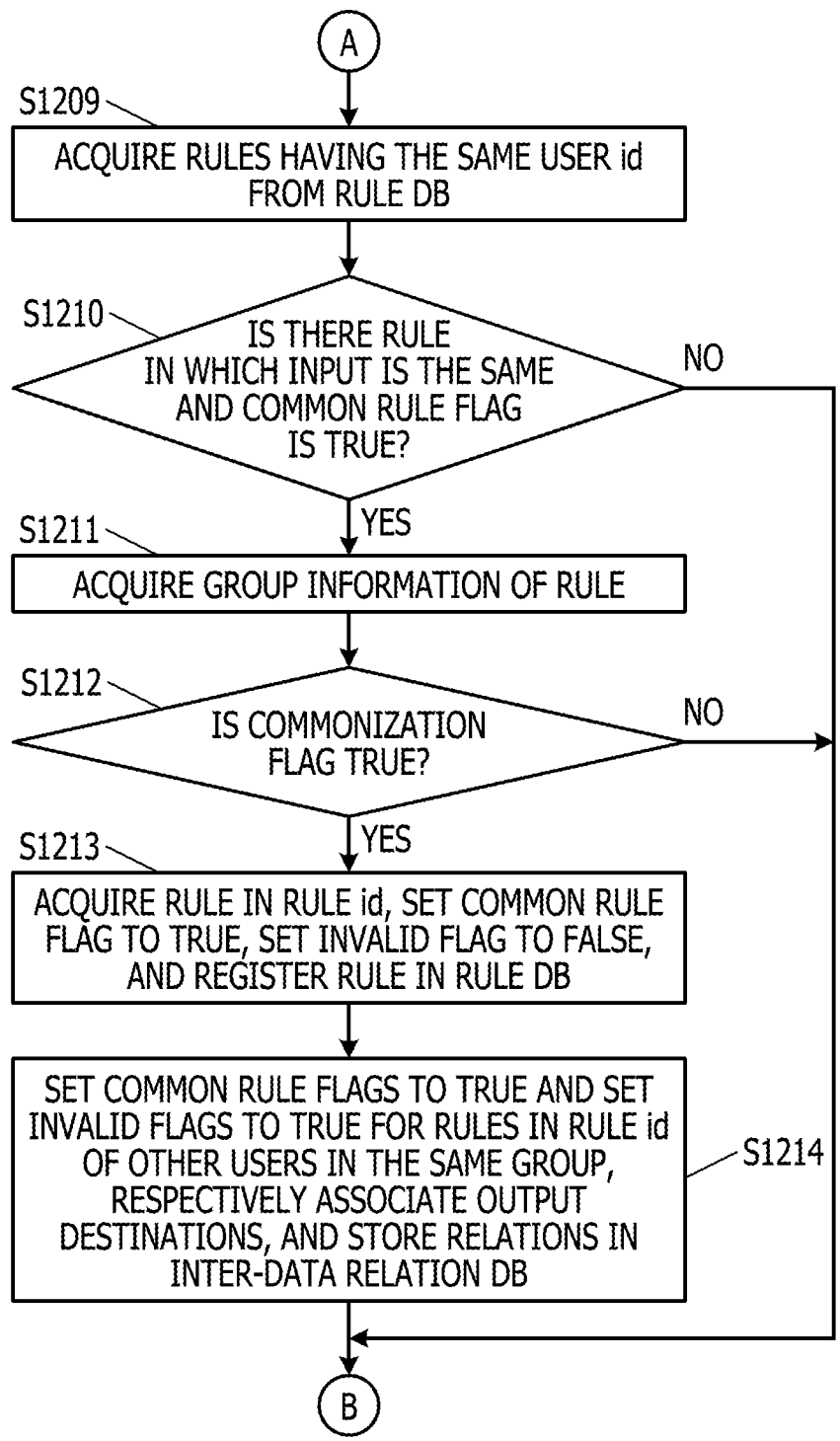

FIG. 12 is a flowchart illustrating an example of a procedure of the processing of the rule registration unit 223. In the flowchart of FIG. 12, the rule registration unit 223 first acquires the rule id and the commonization flag in the designated group registered in the group information DB 213 in order to register a rule of the designated group for a designated user (step S1201). The rules for the group are sequentially processed. For example, in the group information DB 213 in FIG. 6, focusing on "group id"="G3", three rules of "rule id"="R3", "R4", and "R5" from the group of "G3" are sequentially processed.

In a case where all the rules of the group information are processed (step S1202: Yes), the rule registration unit 223 ends the processing. In a case where there are the rule id and the commonization flag of the processing target (step S1202: No), the rule registration unit 223 shifts the processing to step S1203.

The rule registration unit 223 checks that the commonization flag of the processing target is "True" (step S1203). In a case of True (step S1203: Yes), the rule registration unit 223 shifts the processing to step S1204. On the other hand, in a case of False (step S1203: No), the rule registration unit 223 shifts the processing to step S1209.

The rule registration unit 223 acquires rules of other users having the rule id which is the processing target of the same group id as the designated group id from the rule DB 211 (step S1204).

The rule registration unit 223 determines whether the rule is present, for example, the rule is acquired (step S1205). In a case where the rule is acquired (step S1205: Yes), the rule registration unit 223 shifts the processing to step S1206. On the other hand, in a case where the rule is not acquired (step S1205: No), the rule registration unit 223 shifts the processing to step S1208.

The rule registration unit 223 acquires a rule in the rule id 403 of the processing target. The rule may be stored in the group information DB 213 or managed by another DB. The data configuration of the rule does not include the group id 402, the common rule flag 408, and the invalid flag 409 of the rule DB 211. For example, the data configuration of the rule includes the user id 401, the rule id 403, the triggering event 404, the data handled as the input 405, the data output destination 406, and the processing to be executed id 407.

The rule registration unit 223 sets the common rule flag of the acquired rule to True, sets the invalid flag thereof to True, associates the designated user with the group, and registers the rule in the rule DB 211 (step S1206). The rule registration unit 223 associates the data output destination of a rule in which the common rule flag is True and the invalid flag is False among the rules acquired in step 1204 with the data output destination of the rule registered in S1206, and stores the relation in the inter-data relation DB 215 (step S1207). Thereafter, the rule registration unit 223 shifts the processing to step S1201 in order to register a next rule of the processing target group.

On the other hand, in a case of step S1205: No, the rule registration unit 223 acquires the rule in the rule id 403 of the processing target. The rule registration unit 223 sets the common rule flag of the acquired rule to True, sets the invalid flag thereof to False, associates the designated user with the group, and registers the rule in the rule DB 211 (step S1208). Thereafter, the rule registration unit 223 shifts the processing to step S1201.

In step S1203, in a case where the commonization flag of the processing target rule of the group information is False (step S1203: No), the rule registration unit 223 acquires a rule of the designated user from the rule DB 211 (step S1209).

Next, the rule registration unit 223 checks that there is a rule in which the data handled as the input is the same and the common rule flag is True among the acquired rules (step S1210). In a case where the rule is not present (step S1210: No), the rule registration unit 223 shifts the processing to step S1201. On the other hand, in a case where the rule is present (step S1210: Yes), the rule registration unit 223 shifts the processing to step S1211.

The rule registration unit 223 acquires a commonization flag from a group id and a rule id of the rule from the group information DB 213 (step S1211).

The rule registration unit 223 checks the acquired commonization flag to determine whether the commonization flag is True (step S1212). In a case where the commonization flag is True (step S1212: Yes), the rule registration unit 223 shifts the processing to step S1213. On the other hand, in a case where the commonization flag is False (step S1212: No), the rule registration unit 223 shifts the processing to step S1201.

The rule registration unit 223 acquires a rule in the rule id of the processing target. The rule registration unit 223 sets the common rule flag of the acquired rule to True, sets the invalid flag to False, associates the designated user with the group, and registers the rule in the rule DB 211 (step S1213).

The rule registration unit 223 sets the common rule flags to True and sets the invalid flags to True for the rules in the rule id of other users in the same group, respectively associates the output destination of the processing target rule with the output destinations of the rules of those other users, and stores the relations in the inter-data relation DB 215 (step S1214).

The pieces of processing when the rule is registered have been described. Although details are omitted, when the rule is released, it is possible to release the commonized file and perform the pieces of processing described above in reverse. For example, when a rule in which the common rule flag is True and the invalid flag is False is released, the rules of other users in the same group are searched and the invalid flag of any rule is changed to True. For the rule in which the commonization flag of the group information is False, the common rule flags of the rules of other users are set to False. This means that the commonization is released. It is also possible to check whether the commonization is possible for the rules of other users.

Contents of Processing of Event Determination Unit 224

Figure 13:
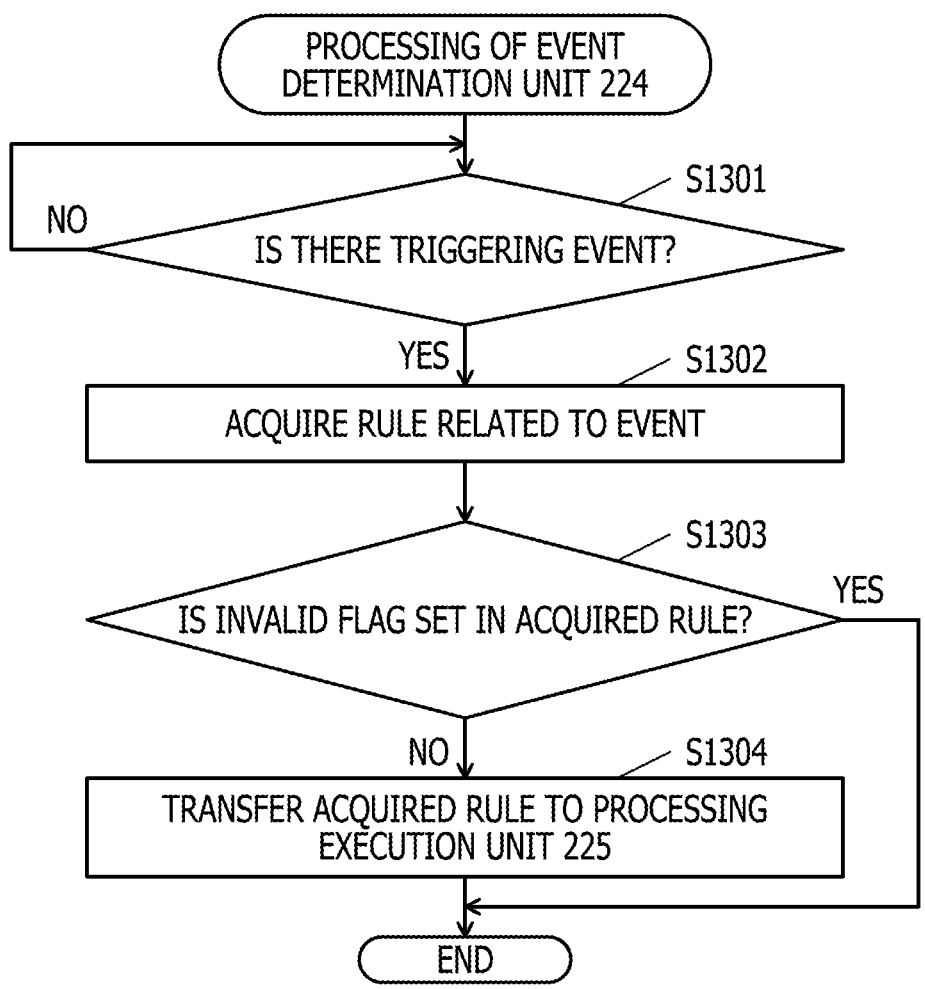
FIG. 13 is a flowchart illustrating an example of a procedure of processing of an event determination unit.

FIG. 13 is a flowchart illustrating an example of a procedure of the processing of the event determination unit 224. In the flowchart of FIG. 13, the event determination unit 224 determines whether there is the triggering event (step S1301). There are various contents as the triggering event. For example, in a case where the update of input data is an example of the event, it is possible to regard the input data update as the event by receiving the update of the input data.

In step S1301, after waiting for the triggering event (step S1301: No), in a case where there is a triggering event (step S1301: Yes), a rule related to the event is acquired (step S1302). For example, it is possible to acquire the rule by extracting the rule related to the event corresponding to the "triggering event" column 404 of the rule DB 211.

Next, it is determined whether the invalid flag is set in the acquired rule (step S1303). For example, it is possible to determine whether the invalid flag is set in the acquired rule depending on whether the "invalid flag" column 409 of the rule DB 211="True". In a case where the invalid flag is set (step S1303: Yes), a series of pieces of processing ends without doing anything. Therefore, "processing" is not executed since "processing" related to the rule is invalidated (as will be described below, the execution of the processing is not requested since the execution result is already copied to the output destination).

On the other hand, in step S1303, in a case where the invalid flag is not set in the acquired rule (step S1303: No), the acquired rule is transferred to the processing execution unit 225.

Contents of Processing of Processing Execution Unit 225

Figure 14:
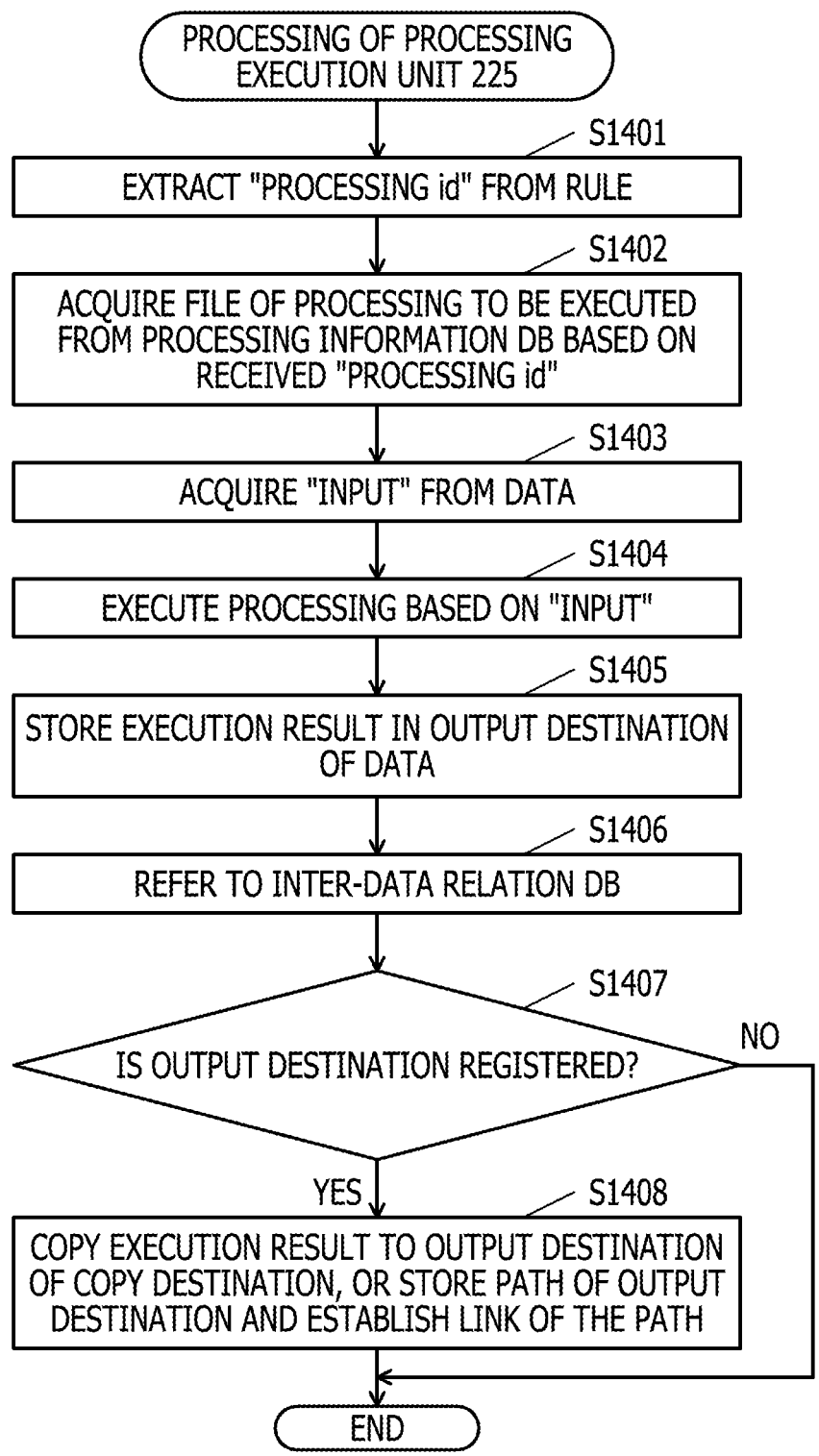
FIG. 14 is a flowchart illustrating an example of a procedure of processing of a processing execution unit.

FIG. 14 is a flowchart illustrating an example of a procedure of the processing of the processing execution unit 225. In the flowchart of FIG. 14, the processing execution unit 225 extracts "processing (to be executed) id" from a rule received from the event determination unit 224 (step S1401). For example, it is possible to extract the processing id associated with the rule acquired from "processing to be executed id" 407 of the rule DB 211.

In step S1401, a file of the processing to be executed is acquired from the processing information DB 212 based on "processing id" (step S1402).

Next, "input" is acquired from the data 210 (step S1403). Next, the processing is executed based on the acquired "input" (step S1404). For example, in a case where the processing id is "P1", "GPS (latitude and longitude information)" which is the input is acquired from the data 210. Information on "weather" at a position indicated by the latitude and longitude information is derived from "GPS (latitude and longitude information)". This means that the processing of processing id="P1" is executed. It is possible to refer to the external resource such as Web service to derive from "GPS" to "weather".

The execution result is stored in the output destination of the data (step S1405). For example, the information on "weather" (sunny, rainy, cloudy, or the like) is stored in "/group 1/A1/result" which is the output destination of the data as the execution result. This example means the processing result of A1 user of the group 1. The way of expression of the output destination is not limited to this example.

Next, the inter-data relation DB 215 is referred (step S1406). It is determined whether the output destination of the data in which the execution result is stored in step S1405 is registered in the inter-data relation DB 215 (step S1407). In a case where the output destination of the data in which the execution result is stored is not registered in the inter-data relation DB 215 (step S1407: No), a series of pieces of processing ends without doing anything.

On the other hand, in a case where the output destination of the data in which the execution result is stored is registered in the inter-data relation DB 215 (step S1407: Yes), the execution result is copied to the output destination of the copy destination (step S1408). For example, as illustrated in FIG. 8, since the output destination of the data "/group 1/A1/result" is registered, the execution result of the information on "weather" is respectively copied to "/group 2/A1/result" and "/group 2/B1/result" which are the copy destination.

Alternatively, in step S1408, a path of the output destination of the execution result may be stored in the output destination of the copy destination, a link of the path may be established, and the link thereof may be referred in the form of the link instead of copying the execution result to the output destination of the copy destination. In this manner, it is possible to acquire the execution result also in the invalid processing. In addition to establishing the link each time to the processing result, the link may be established when the inter-data relation DB 215 is associated with the output destination and the relation is stored in the rule registration unit 223.

A series of pieces of processing has ended. In this manner, even in the case where the invalid flag is set (step S1303:

Yes) in the flowchart of FIG. 13, it is possible to acquire the execution result without executing "processing".

As described above, according to the embodiment, in executing the processing using the information on the input and outputting the execution result of the processing due to the occurrence of the event, in a case where there are a plurality of the same pieces of processing (common rule flag: "True") using the information on the same input, it is possible to reduce wasteful processing since only one (invalid flag: "False") among the plurality of the same pieces of processing is executed.

According to the embodiment, since the execution of the processing (invalid flag: "True") other than the processing to be executed among the plurality of the same pieces of processing is invalidated, the wasteful processing is not requested to be executed.

According to the embodiment, since the execution result of valid processing (invalid flag: "False") in which only one among the plurality of pieces of processing is executed is set as the execution result of invalidated invalid processing (invalid flag: "True"), it is possible to output (provide) the execution result also for the invalidated invalidation processing.

According to the embodiment, the execution result of the valid processing (invalid flag: "False") is stored in the output destination of the execution result of the invalid processing (invalid flag: "True"). It is possible to obtain the same effect as if the execution result is obtained by executing the processing related to the invalid processing.

According to the embodiment, the information on the output destination of the execution result of the valid processing (invalid flag: "False") is stored in the output destination of the execution result of the invalid processing (invalid flag: "True"). Therefore, similarly, it is possible to obtain the same effect as if the execution result is obtained by executing the processing related to the invalid processing.

According to the embodiment, in a case where there are a plurality of the same pieces of processing (common rule flag: "True") using the information on the same input in a group, it is possible to reduce the wasteful processing in the group since only one (invalid flag: "False") among the plurality of the same pieces of processing is executed in the group.

According to the embodiment, since the execution of the processing (invalid flag: "True") other than the processing to be executed among the plurality of the same pieces of processing in a group is invalidated, the wasteful processing is not requested to be executed.

In this manner, according to the embodiment, it is possible to achieve the reduction of the redundant processing and the saving of the resource.

EXAMPLE 1

Figure 15:
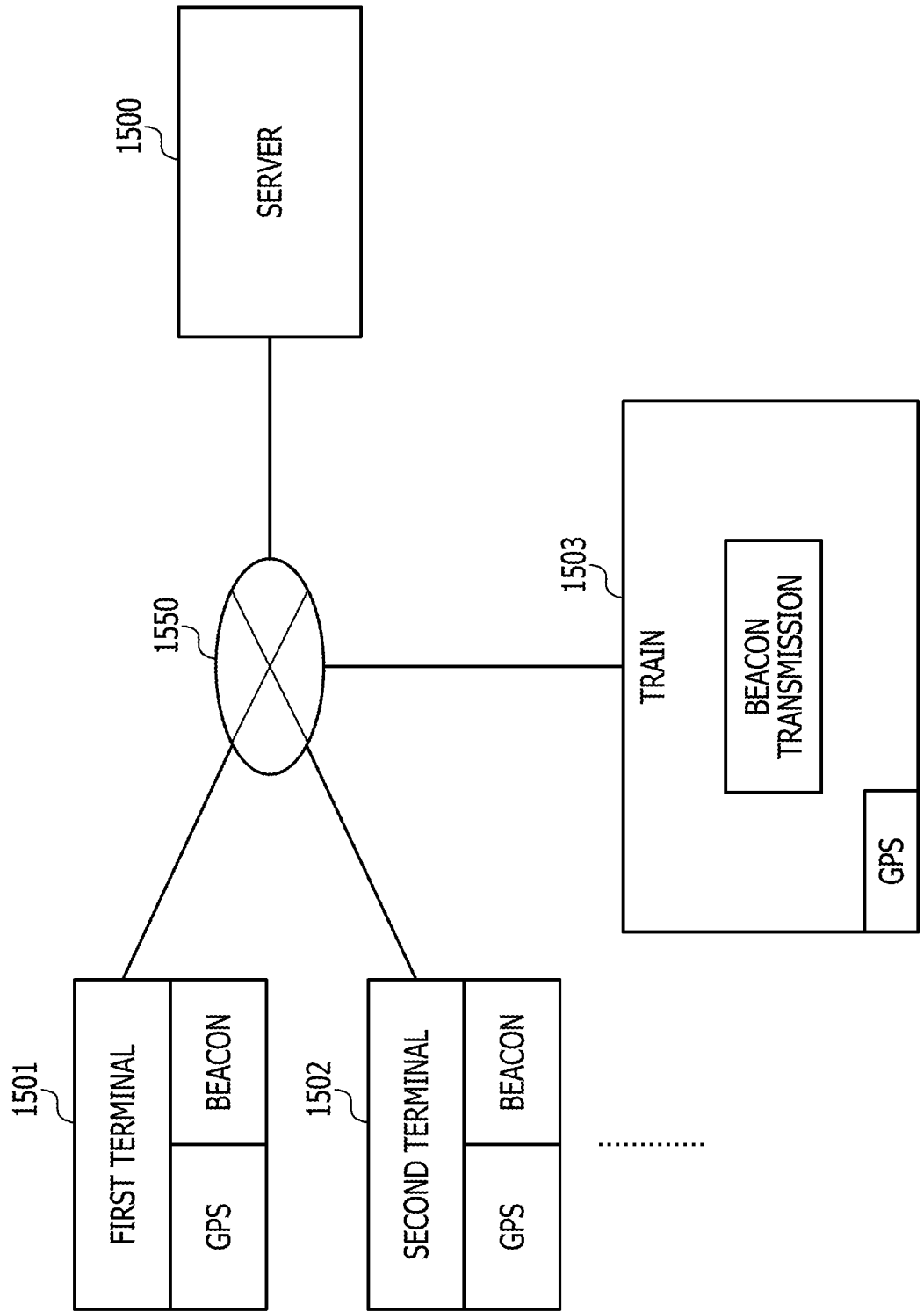
FIG. 15 is a system configuration diagram according to Example 1 (example of executing an in-train service)

Next, an Example (Example 1) will be described. FIGS. 15 to 20 are examples of executing an in-train service. FIG. 15 is a system configuration diagram according to Example 1. In FIG. 15, the system that realizes the in-train service is configured of the server 1500 which is an example of the information processing apparatus 201, terminal apparatuses (first terminal 1501, second terminal 1502, . . . ), and a train 1503, which are connected to each other by a network 1550. The first terminal 1501 and the second terminal 1502 have a function of acquiring the GPS information and a function of receiving a beacon. The train 1503 has the function of acquiring the GPS information and a function of transmitting the beacon.

Figure 16:
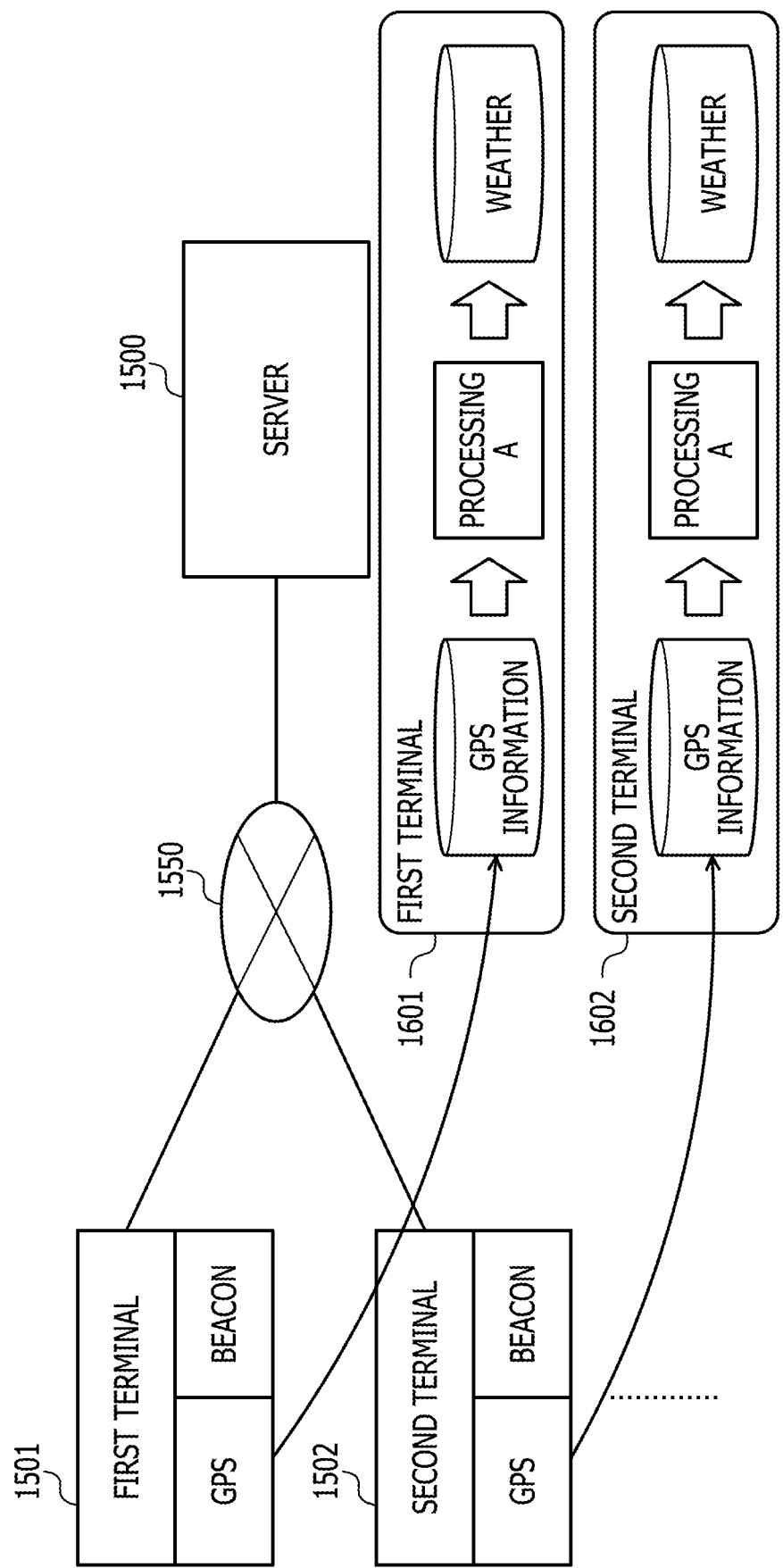
FIG. 16 is an explanatory diagram illustrating contents (situation not on a train) of Example 1.

FIG. 16 illustrates a situation where both of respective users of the first terminal 1501 and the second terminal 1502 are not on the train 1503. In FIG. 16, the user of the first terminal 1501 uses a weather service regardless of the situation. The server 1500 receives the GPS information of the first terminal 1501, executes the processing A, and notifies (outputs) weather on site as indicated by 1601. Similarly, the server 1500 receives the GPS information of the second terminal 1502, executes the processing A, and notifies (outputs) the weather on site as indicated by 1602.

In such a situation, it is impossible to integrate the processing A of the first terminal 1501 and the processing A of the second terminal 1502. Therefore, even though the processing A of the first terminal 1501 and the processing A of the second terminal 1502 are the same processing, the pieces of processing A are separately executed.

Figure 17:
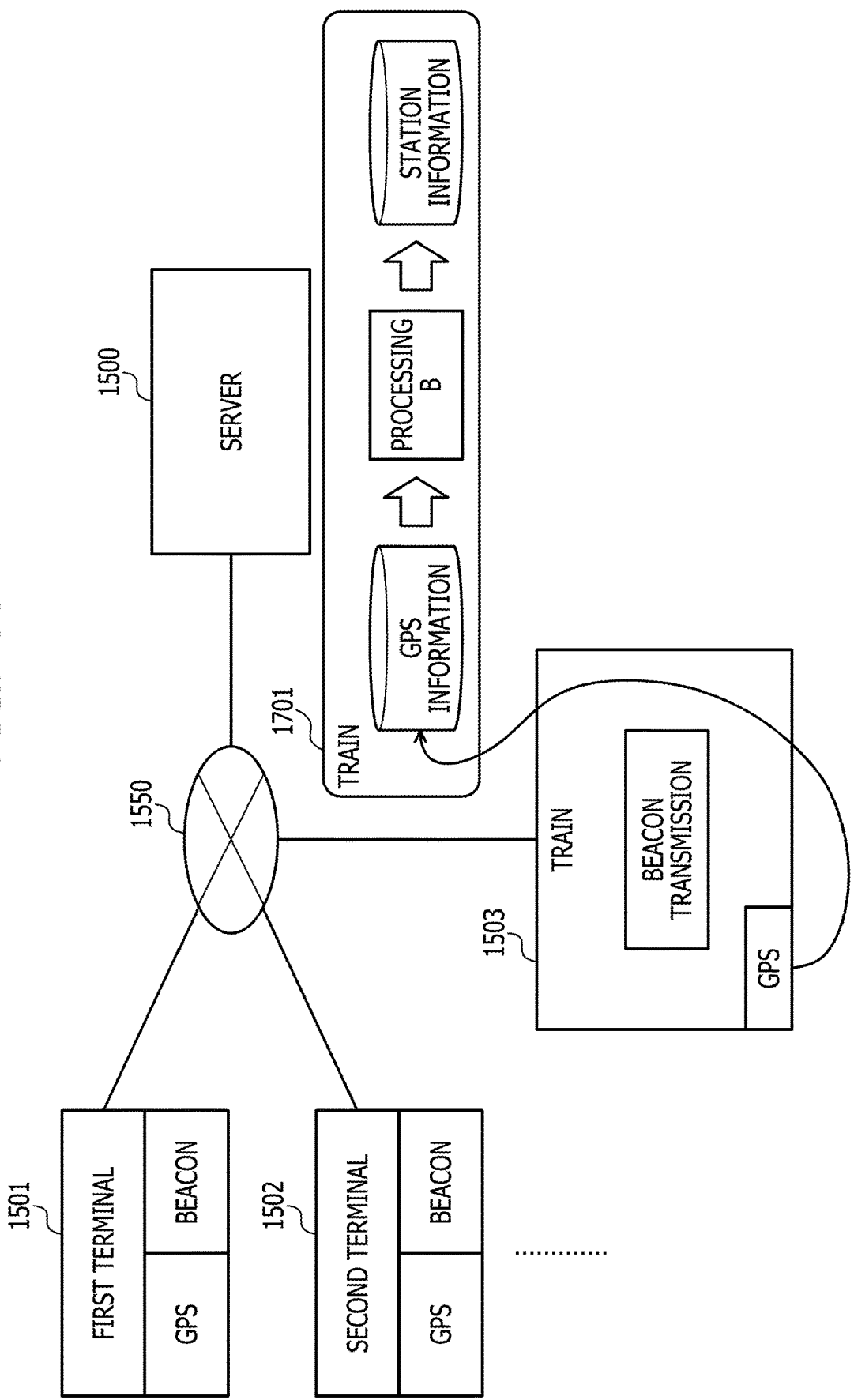
FIG. 17 is an explanatory diagram illustrating contents (in-train service situation) of Example 1.

FIG. 17 illustrates a situation of service in the train 1503. In FIG. 17, the server 1500 receives the GPS information of the train 1503, executes the processing B, and notifies (outputs) station information as indicated by 1701.

Figure 18:
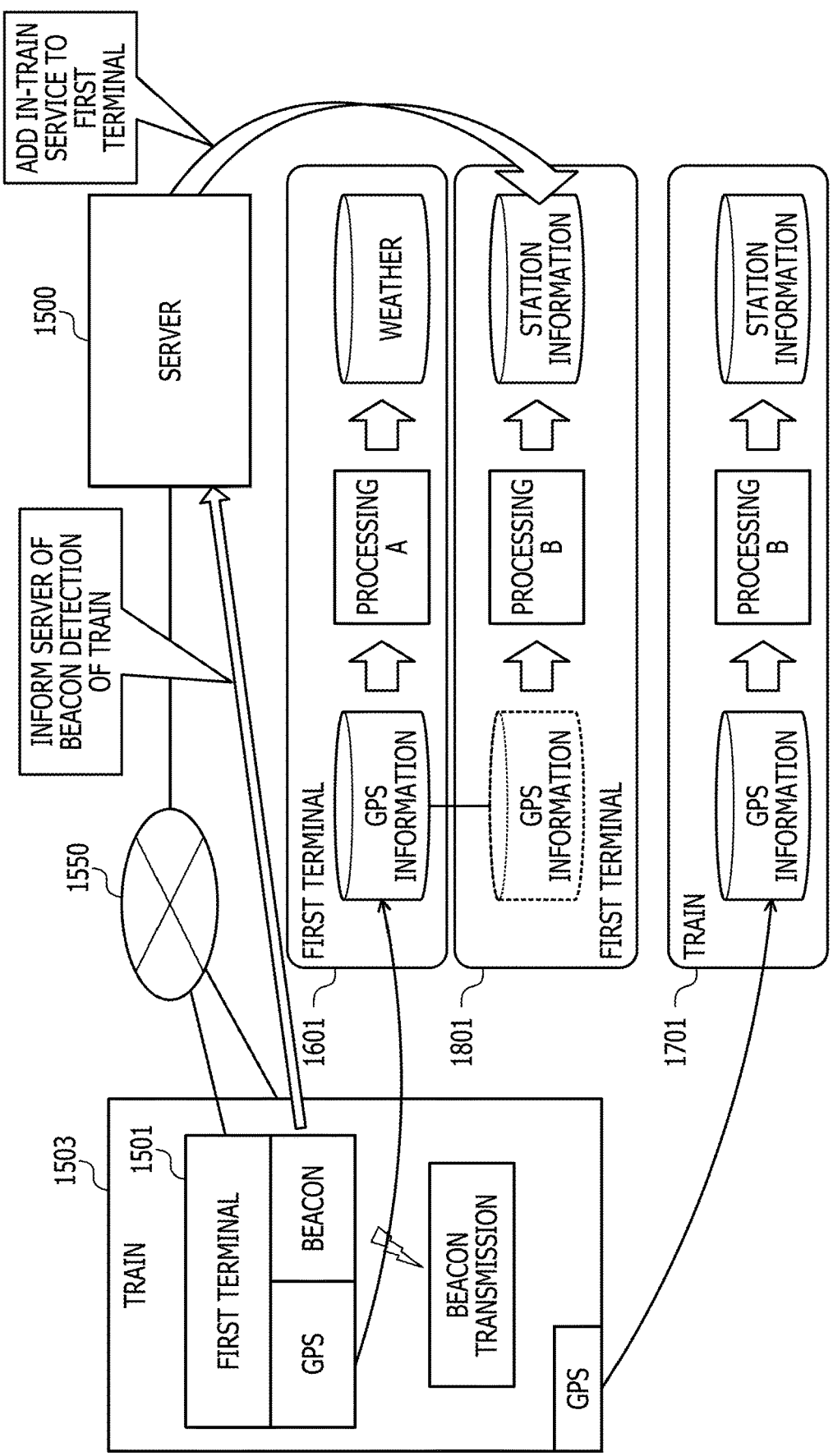
FIG. 18 is an explanatory diagram illustrating contents (situation where a user of a first terminal is on a train (No. 1)) of Example 1.
Figure 19:
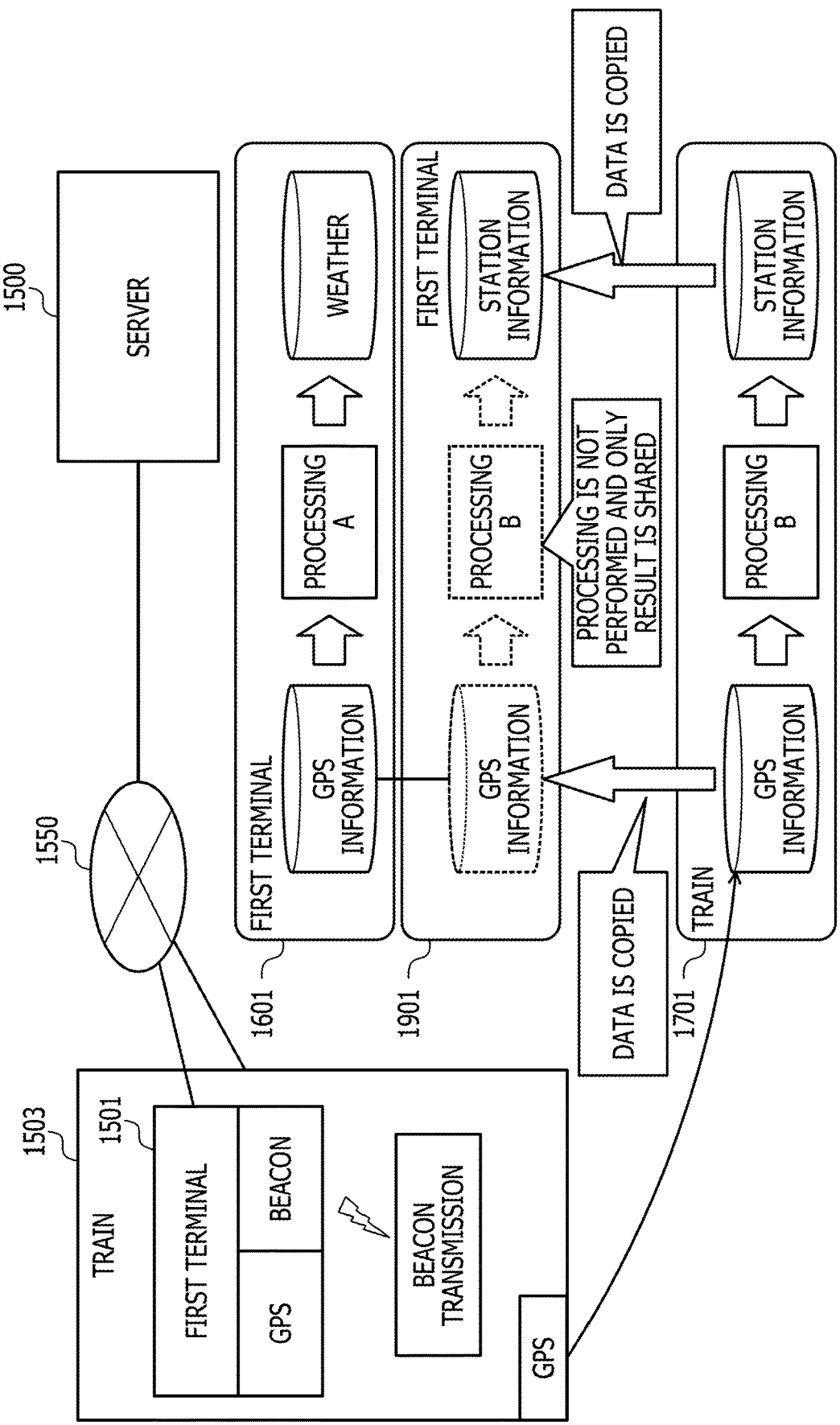
FIG. 19 is an explanatory diagram illustrating contents (situation where the user of the first terminal is on the train (No. 2)) of Example 1.

FIGS. 18 and 19 illustrate a situation where the user of the first terminal 1501 is on the train 1503. In FIG. 18, the function of receiving the beacon of the first terminal 1501 detects the beacon transmitted by the function of transmitting the beacon of the train 1503 in the first terminal 1501, and the service in the train 1503 is added. FIG. 18 illustrates service addition in a case where this scheme is not implemented. 1801 is added to the first terminal as an in-train service. FIG. 19 illustrates service addition in a case where this scheme is implemented.

For example, the server 1500 is informed of the fact that the first terminal 1501 detects the beacon of the train 1503 through the network 1550. Accordingly, the server 1500 acquires the group information registered for the in-train service from the group information DB 213 and designates a group acquired for the first terminal to request the rule registration from the rule registration unit 223. Since the GPS information is the same in the train, 1701 is an integratable rule and it is possible to add the in-train service to the first terminal 1501 as indicated by 1901.

In FIG. 19, it is possible to integrate the pieces of processing B since the GPS information of the first terminal 1501 is the same as the GPS information of the train 1503 in the train 1503 (for example, while the beacon is detected). For example, the server 1500 copies the GPS information which is the input from the GPS information of 1701 as indicated by 1901. The rule of 1901 is triggered by the change in the GPS information, but the processing is not executed since the rule is commonized with 1701. The station information which is the output is copied due to the processing execution of 1701. Therefore, the processing B is not performed and only the result (station information) is shared in 1901. Accordingly, it is possible to reduce the resource requested for executing the processing B.

Figure 20:
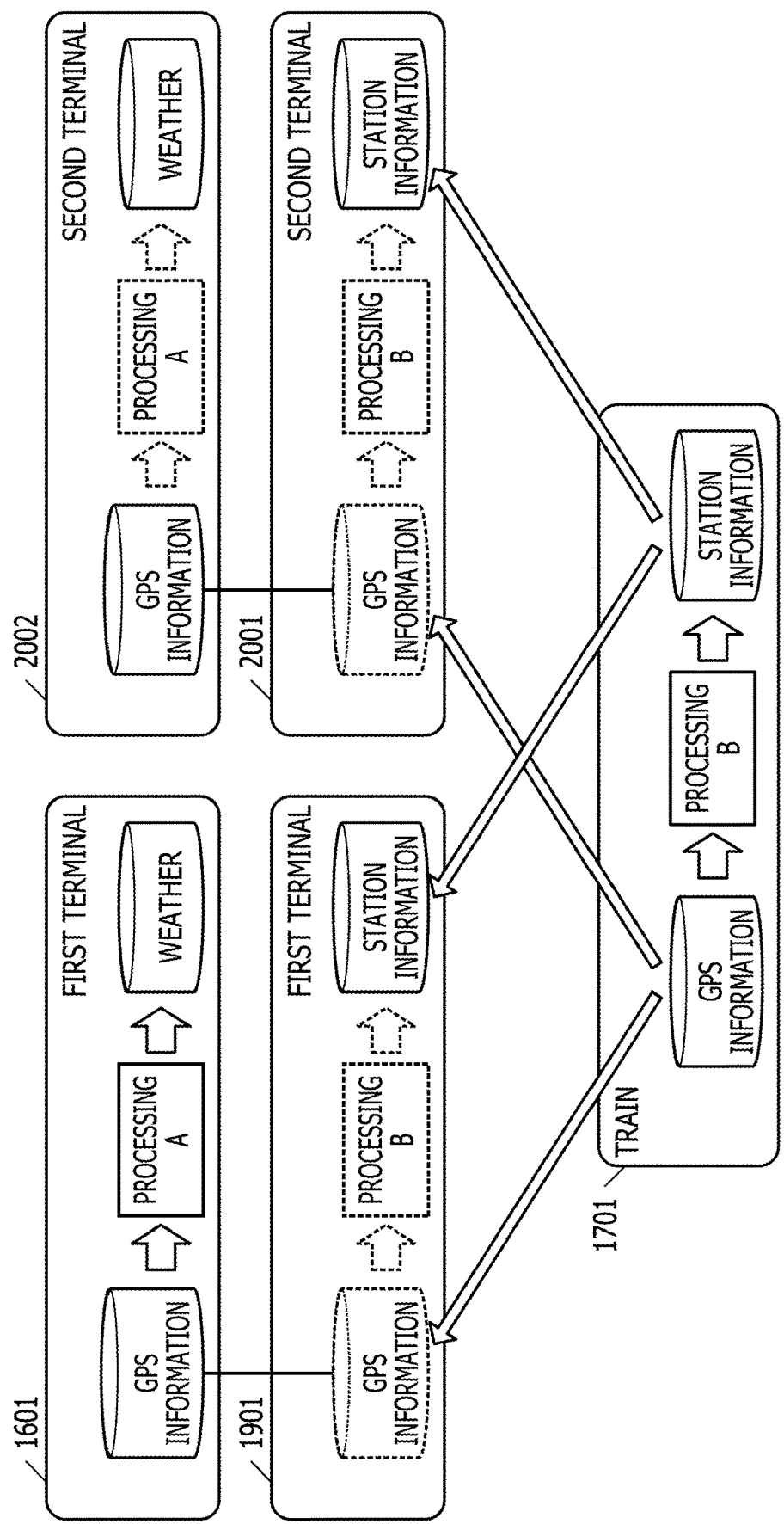
FIG. 20 is an explanatory diagram illustrating contents (situation where a user of a second terminal is on the train) of Example 1.

FIG. 20 illustrates a situation where not only the user of the first terminal 1501 but also the user of the second terminal 1502 is in the train 1503. In FIG. 20, since the GPS information of the first terminal 1501 and the GPS information of the second terminal 1502 are the same as the GPS information of the train 1503 in the train 1503 (while beacon is detected), it is possible to integrate the pieces of processing B of the first terminal 1501 and the second terminal 1502 into the processing B of the train 1503 as indicated by 1901 and 2001.

Since the GPS information of the first terminal 1501 and the GPS information of the second terminal 1502 are the same as indicated by 1601 and 2002, it is also possible to integrate the processing A of the first terminal 1501 and the processing A of the second terminal 1502. In this manner, it is possible to reduce the resources for three pieces of processing as illustrated in FIG. 20.

EXAMPLE 2

Figure 21:
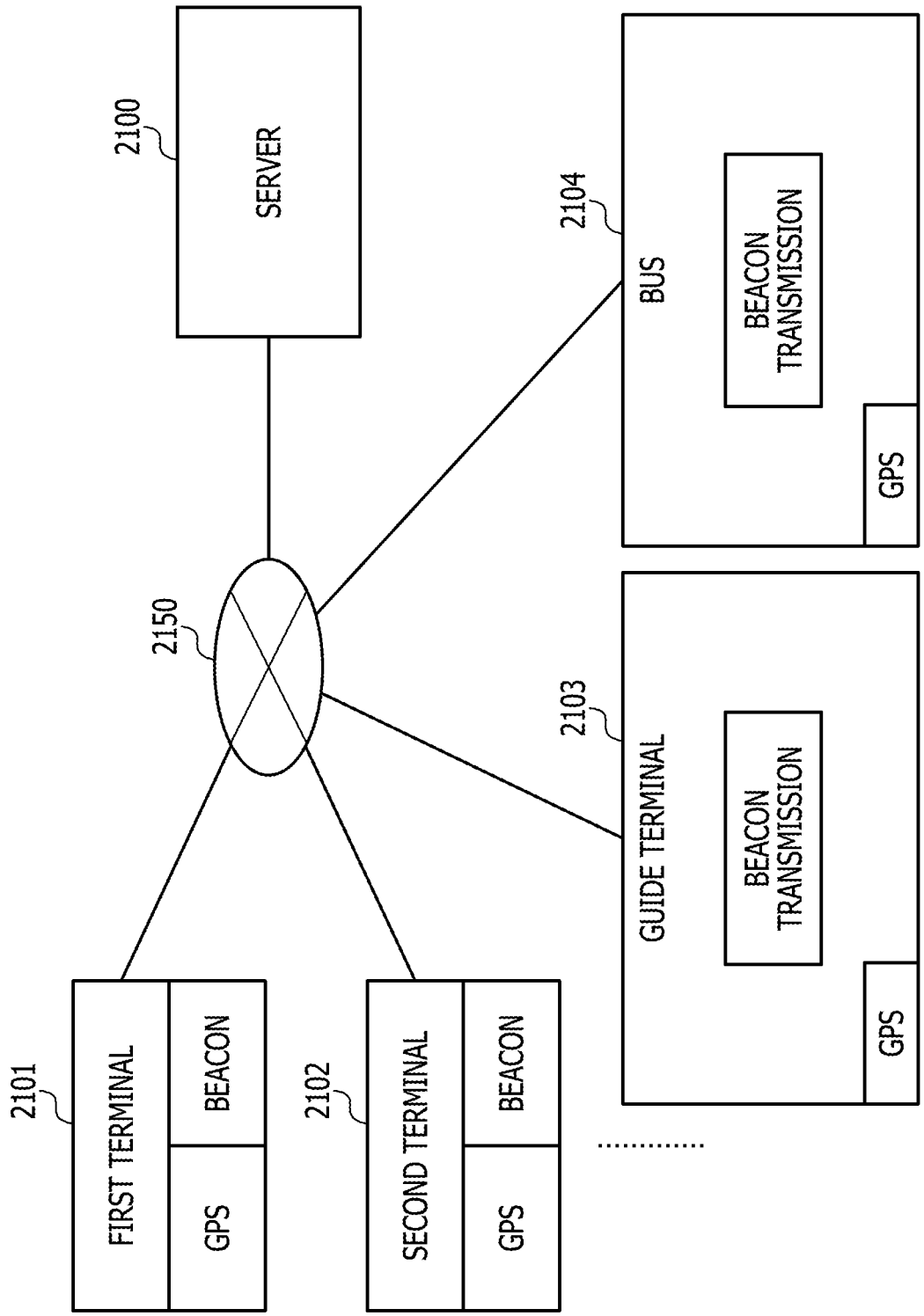
FIG. 21 is a system configuration diagram according to Example 2 (example of participating in a bus tour)

Next, another Example (Example 2) will be described. FIGS. 21 to 24 are examples of summarizing the pieces of processing in the situation of participating in the bus tour. FIG. 21 is a system configuration diagram of Example 2.

In FIG. 21, the system that realizes a service of the bus tour is configured of the server 2100 which is an example of the information processing apparatus 201, terminal apparatuses (first terminal 2101, second terminal 2102, . . . ), a guide terminal 2103 used by a tour guide, and a bus 2104, which are connected to each other by a network 2150. The first terminal 2101 and the second terminal 2102 have, similarly to Example 1, the function of acquiring the GPS information and the function of receiving the beacon. The guide terminal 2103 and the bus 2104 have the function of acquiring the GPS information and the function of transmitting the beacon.

Figure 22:
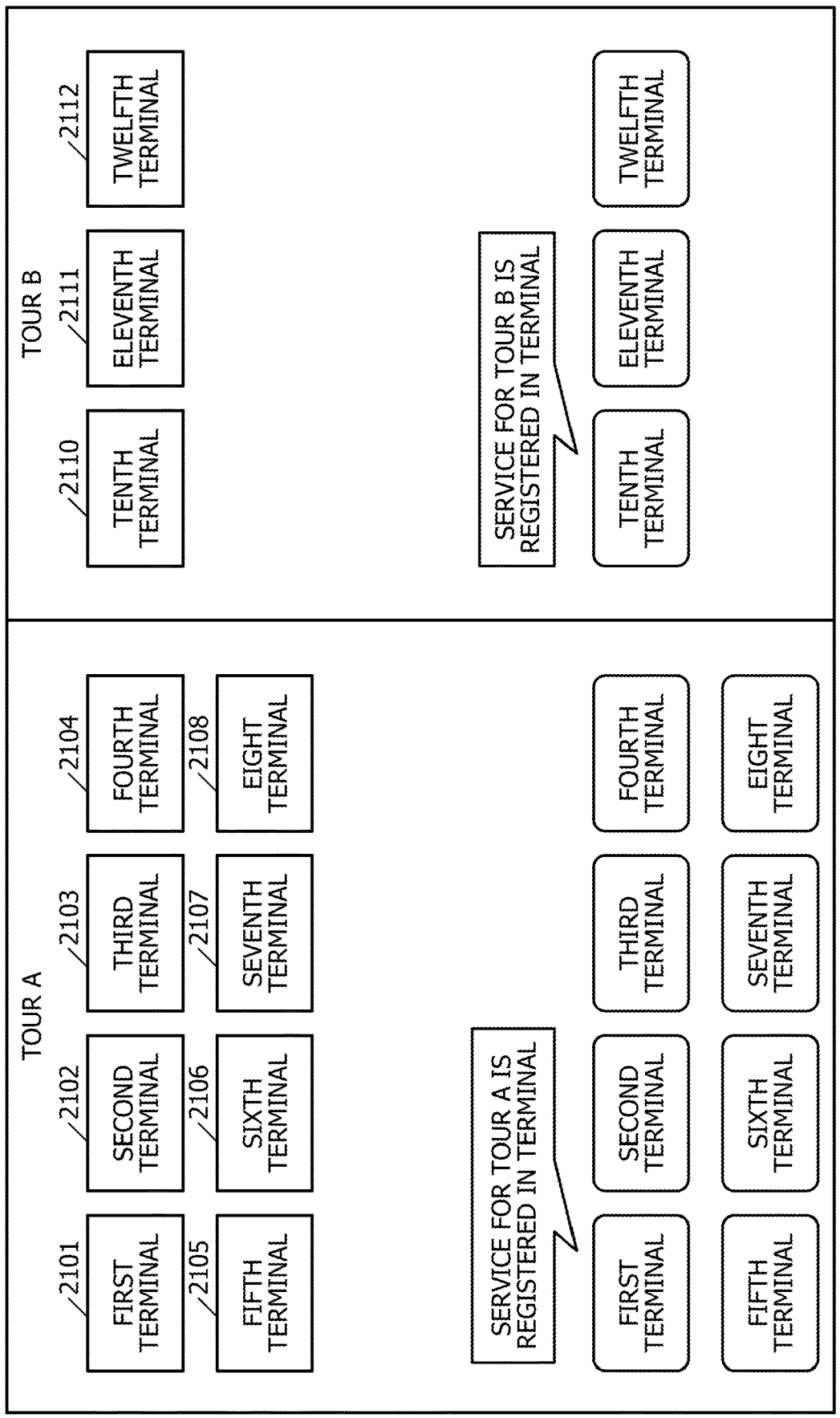
FIG. 22 is an explanatory diagram illustrating contents (contents of an event of participating in the tour) of Example 2.

FIG. 22 is an explanatory diagram illustrating contents of an event of participating in the tour. In FIG. 22, eight people in total of each user of the first terminal 2101 to an eighth terminal 2108 participate in tour A. Three people in total of each user of a tenth terminal 2110 to a twelfth terminal 2112 participate in tour B.

A service for tour A is registered in the first terminal 2101 to the eighth terminal 2108 participating in tour A. A service for tour B is registered in the tenth terminal 2110 to the twelfth terminal 2112 participating in tour B.

Figure 23:
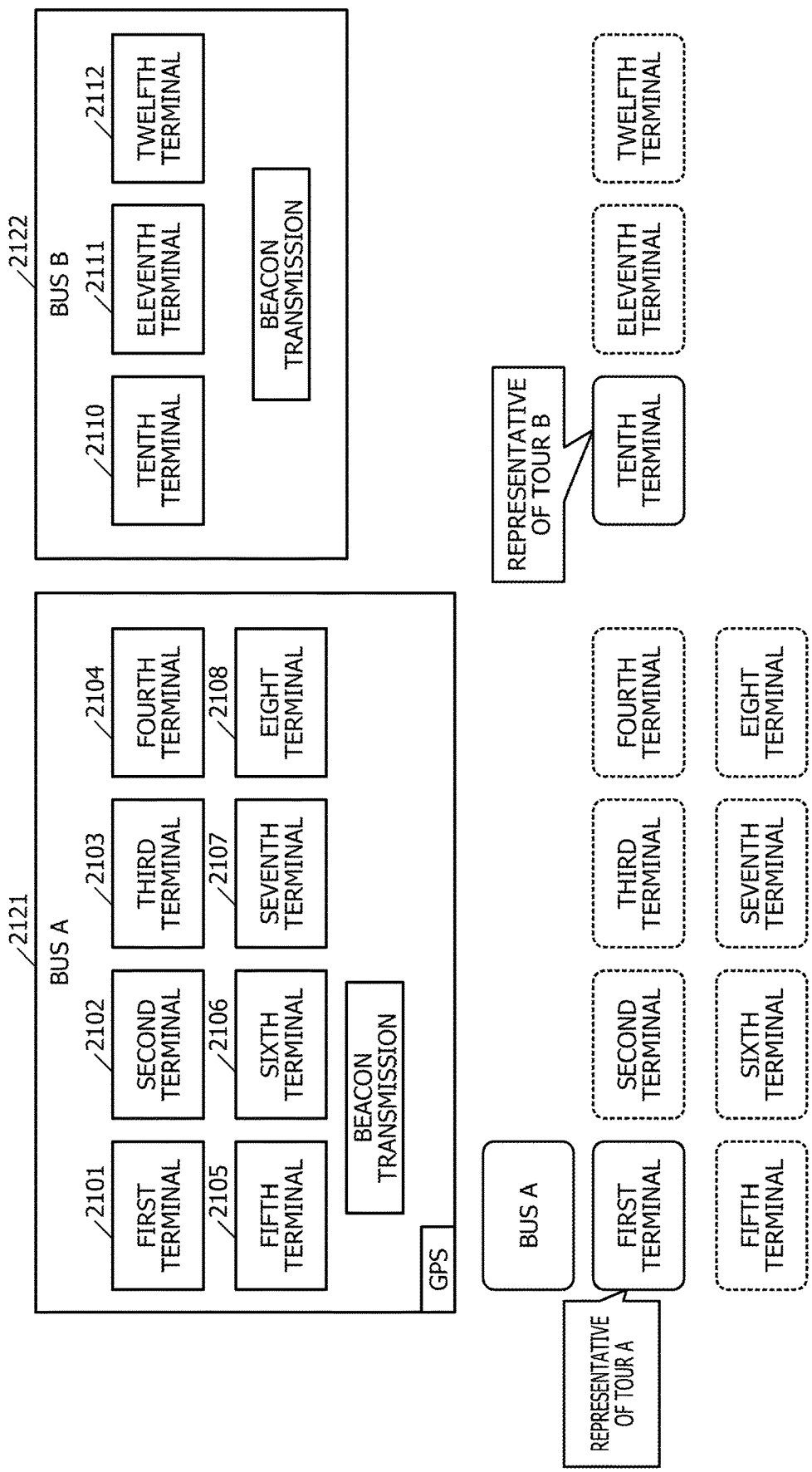
FIG. 23 is an explanatory diagram illustrating contents (situation where each participant of the tour moves by bus) of Example 2.

FIG. 23 illustrates a situation where each participant of the tour moves by bus. In FIG. 23, each user of the first terminal 2101 to the eighth terminal 2108 is in a bus A 2121. The beacon transmitted by the function of transmitting the beacon of the bus A 2121 is detected by the functions of receiving the beacon of the first terminal 2101 to the eighth terminal 2108 to know the fact that each user of the first terminal 2101 to the eighth terminal 2108 is in the bus A 2121.

In a case where the first terminal 2101 is set as a representative of tour A, only the first terminal 2101 performs pieces of processing related to the service for tour A. The pieces of processing related to the service for tour A are invalidated for other terminals (second terminal 2102 to eighth terminal 2108). It is possible for other terminals (second terminal 2102 to eighth terminal 2108) to receive the provision of the service for tour A by respectively copying an output of the first terminal 2101 to other terminals (second terminal 2102 to eighth terminal 2108).

Each user of the tenth terminal 2110 to the twelfth terminal 2112 is in a bus B 2122. The beacon transmitted by the function of transmitting the beacon of the bus B 2122 is detected by the functions of receiving the beacon of the tenth terminal 2110 to the twelfth terminal 2112 to know the fact that each user of the tenth terminal 2110 to the twelfth terminal 2112 is in the bus B 2122.

In a case where the tenth terminal 2110 is set as a representative of tour B, only the tenth terminal 2110 performs pieces of processing related to the service for tour B. The pieces of processing related to the service for tour B are invalidated for other terminals (eleventh terminal 2111 and twelfth terminal 2112). It is possible for other terminals (eleventh terminal 2111 and twelfth terminal 2112) to receive the provision of the service for tour B by respectively copying an output of the tenth terminal 2110 to other terminals (eleventh terminal 2111 and twelfth terminal 2112).

In this manner, other terminal apparatuses (second terminal 2102 to eighth terminal 2108) other than the first terminal 2101 may not perform the pieces of processing related to the service for tour A by setting the first terminal 2101 as the representative of tour A and by causing only the first terminal 2101 to perform the pieces of processing related to the service for tour A and thus it is possible to reduce the processing by that amount. Other terminal apparatuses (eleventh terminal 2111 and twelfth terminal 2112) other than the tenth terminal 2110 may not perform the pieces of processing related to the service for tour B by setting the tenth terminal 2110 as the representative of tour B and by causing only the tenth terminal 2110 to perform the pieces of processing related to the service for tour B and thus it is possible to reduce the processing by that amount.

Figure 24:
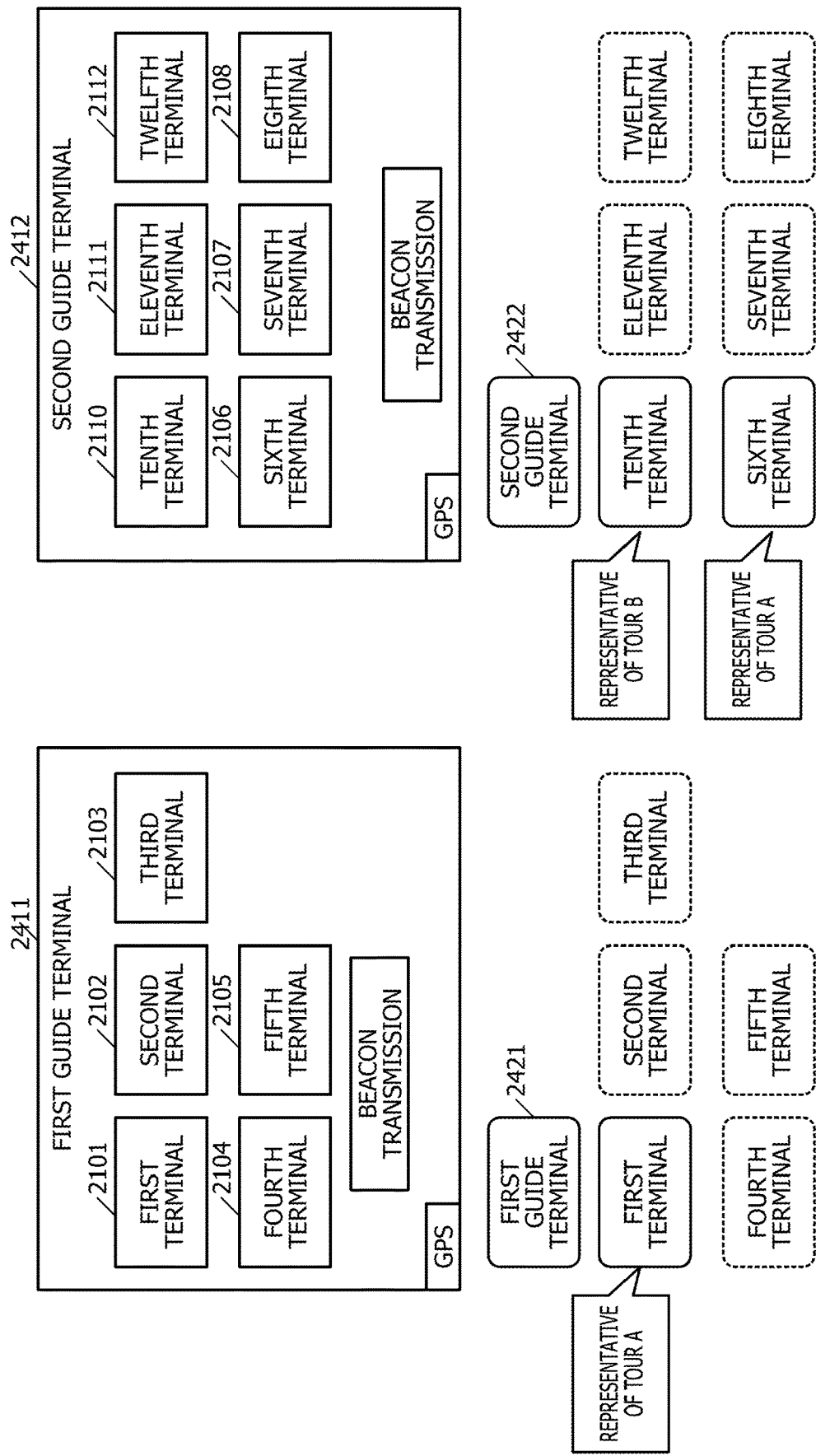
FIG. 24 is an explanatory diagram illustrating contents (situation where each participant of the tour sightsees with a guide) of Example 2.

FIG. 24 illustrates a situation where each participant of the tour sightsees with a guide. As illustrated in FIG. 24, it is known that each user of the first terminal 2101 to the fifth terminal 2105 among the users participating in tour A sightsees with the guide of a first guide terminal 2411. On the other hand, it is known that each user of the sixth terminal 2106 to the eighth terminal 2108 among the users participating in tour A and each user of the tenth terminal 2110 to the twelfth terminal 2112 among the users participating in tour B sightsee with the guide of a second guide terminal 2412.

In this situation, for the users sightseeing with the guide of a first guide terminal 2421, the first terminal 2101 is set as the representative of tour A and only the first terminal 2101 performs the pieces of processing related to the service for tour A. For other terminals (second terminal 2102 to fifth terminal 2105), the pieces of processing related to the service for tour A are invalidated. It is possible for other terminals (second terminal 2102 to fifth terminal 2105) to receive the service for tour A by respectively copying an output of the first terminal 2101 to other terminals (second terminal 2102 to fifth terminal 2105).

For the users sightseeing with the guide of a second guide terminal 2422, the sixth terminal 2106 is set as the representative of tour A and only the sixth terminal 2106 performs the pieces of processing related to the service for tour A. For other terminals (seventh terminal 2107 and eighth terminal 2108), the pieces of processing related to the service for tour A are invalidated. It is possible for other terminals (seventh terminal 2107 and eighth terminal 2108) to receive the service for tour A by respectively copying an output of the sixth terminal 2106 to other terminals (seventh terminal 2107 and eighth terminal 2108).

The tenth terminal 2110 is set as the representative of tour B and only the tenth terminal performs the pieces of processing related to the service for tour B. For other terminals (eleventh terminal 2111 and twelfth terminal 2112), the pieces of processing related to the service for tour B are invalidated. It is possible for other terminals (eleventh terminal 2111 and twelfth terminal 2112) to receive the service for tour B by respectively copying an output of the tenth terminal 2110 to other terminals (eleventh terminal 2111 and twelfth terminal 2112).

In this manner, it is understood that the form of the commonization of each piece of processing is changed by the participation of each user in different groups, respectively.

Figure 25:
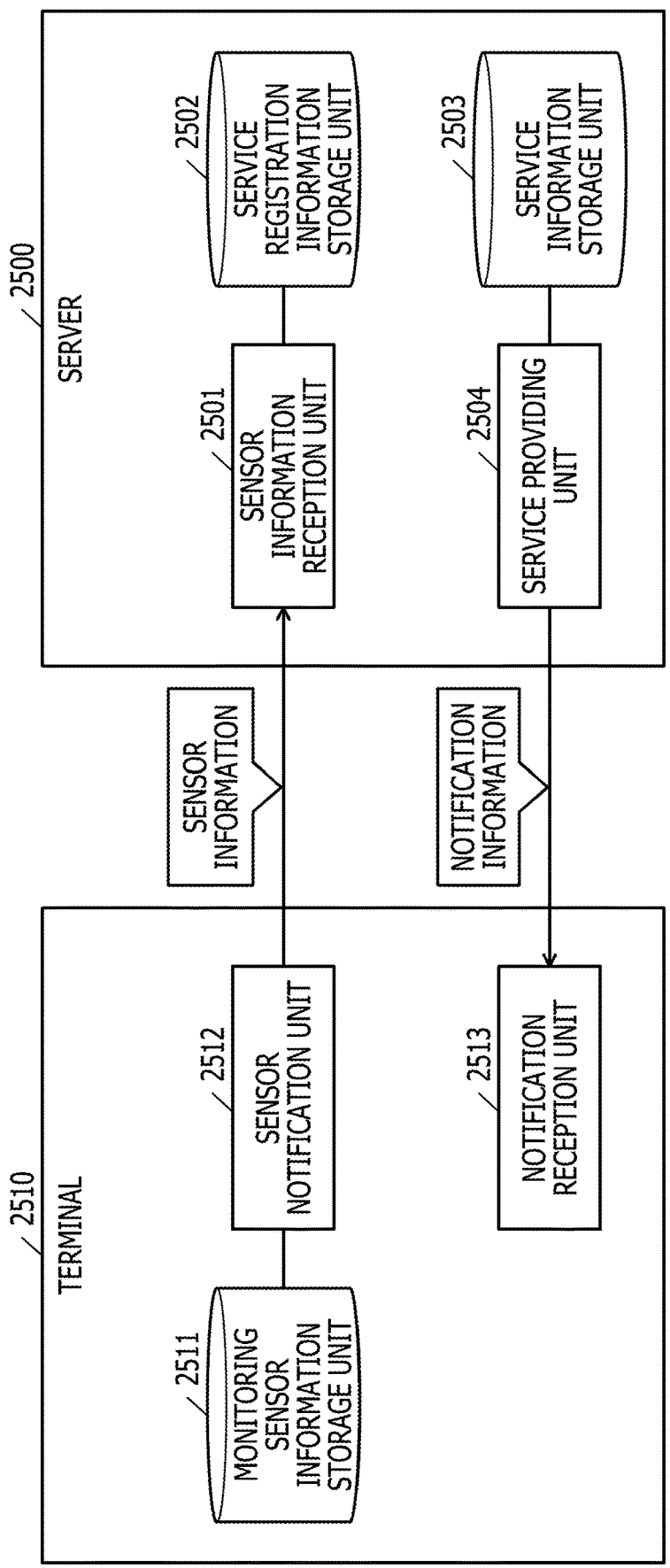
FIG. 25 is an explanatory diagram illustrating a configuration example of a server and a terminal in Example.

FIG. 25 is an explanatory diagram illustrating a configuration example of a server and a terminal in Example. In FIG. 25, a server 2500 includes a sensor information reception unit 2501, a service registration information storage unit 2502, a service information storage unit 2503, and a service providing unit 2504. The terminal 2510 includes a monitoring sensor information storage unit 2511, a sensor notification unit 2512, and a notification reception unit 2513.

The terminal 2510 stores sensor information to be monitored in the monitoring sensor information storage unit 2511, and the sensor notification unit 2512 informs the server 2500 of the sensor information when the sensor is changed. The server 2500 stores service registration information for each terminal 2510 in the service registration information storage unit 2502.

When the sensor information reception unit 2501 receives the sensor information from the terminal 2510 and registration is made in a service corresponding to the received sensor information, the service starts for the terminal. The starting of the service indicates that a group corresponding to the service is designated and a rule for the terminal 2510 is registered. When information to be provided in the service is stored in the service information storage unit 2503, the service providing unit 2504 transmits notification information to the terminal 2510. The notification reception unit 2513 of the terminal 2510 receives the notification information. The service providing unit 2504 may transmit data to the terminal 2510 when a location of the data 210 is registered in the service information storage unit 2503 and the location is changed. The notification may be made when the location is changed, and the data 210 of the server 2500 may be referred from the terminal 2510 for the data.

For example, when an application is made for tour A, the following pieces of information are registered. The pieces of information are (1) "tour service", (2) "in-bus service", and (3) "guide tour service". The service registration information stored in the service registration information storage unit 2502 is respectively (1) "tour service: none", (2) "in-bus service: bus A", and (3) "guide tour service: first guide". In this manner, the service registration information stored in the service registration information storage unit 2502 stores the pieces of information whether the service is available for each piece of sensor information.

It is also possible to designate the sensor to be monitored as monitoring sensor information. For example, a device such as GPS or beacon may be designated. In this case, all the data from the sensor may be transmitted to the server 2500, and the data may be selected on the server 2500 side. It is also possible to set information limiting a range as the monitoring sensor information. A GPS range, a universally unique identifier (UUID) of the beacon, and the like may be determined on the terminal side, and the data may be transmitted to the server 2500 only in a case where the information matches.

In a case where each piece of sensor information is received and in a case where the service is available, it is possible to start the service corresponding to the sensor information for the terminal 2510. In this manner, it is possible to provide the service with the sensor information as a trigger.

Other Examples Relating to "Input"

Figure 26:
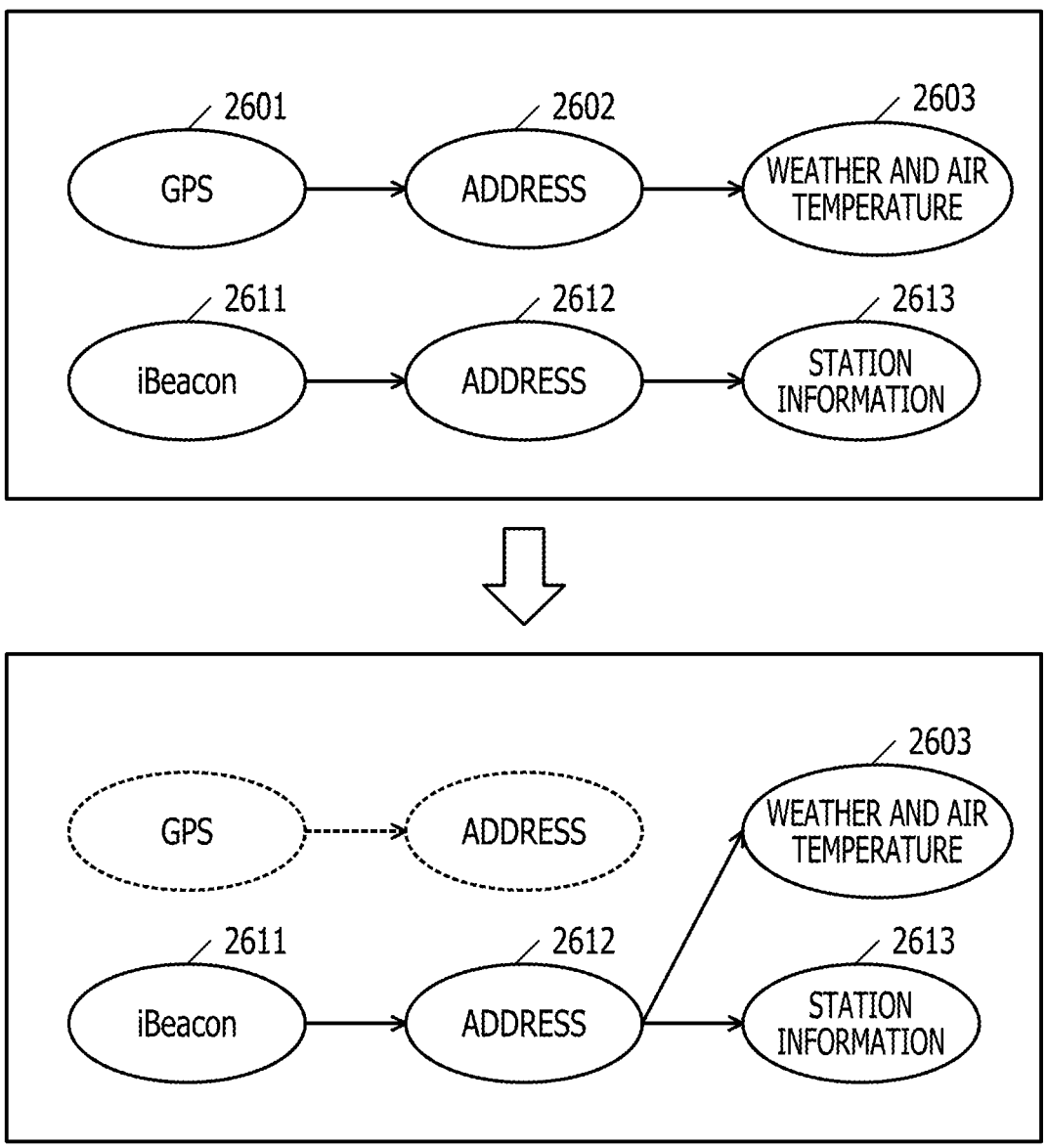
FIG. 26 is an explanatory diagram illustrating another example (No. 1) relating to "input"

FIGS. 26 and 27 are explanatory diagrams illustrating other examples relating to "input". In the upper stage of a figure on the upper side in FIG. 26, a GPS 2601 is converted into an address 2602 and then weather/air temperature 2603 is output based on the address 2602. On the other hand, in the lower stage of the figure on the upper side, an iBeacon 2611 instead of the GPS 2601 is converted into an address 2612 and then station information 2613 is output based on the address 2612.

Focusing on the fact that the address 2602 and the address 2612 are the same, it is possible to output the weather/air temperature 2603 from the address 2612 by using the conversion from the iBeacon 2611 to the address 2612 instead of the conversion from the GPS 2601 to the address 2602 as illustrated in a figure on the lower side. In this manner, it is possible to absorb the difference in input measure for each service by defining the meaning of "input". It is possible to achieve further commonization by performing such input substitution when the service is added.

A figure on the upper side in FIG. 27 illustrates a case where the "input" is periodic like time. For example, the "input" is "every 30 minutes" 2702 on the left side thereof, whereas the "input" is "every 15 minutes" 2712 on the right side thereof. Other "inputs" 2701 and 2711 are the same. In this case, as illustrated in a figure on the lower side, "every 30 minutes" 2702 and "every 15 minutes" 2712 are not set as separate "inputs", but the "inputs" are commonized in the shortest period ("15 minutes"). Accordingly, the pieces of processing of setting the inputs 2701 and 2702 and the output 2703 are not requested to be performed by commonizing the pieces of processing and thus it is possible to reduce the processing by that amount.

FIG. 28 is an explanatory diagram illustrating another example relating to rule registration. In FIG. 28, when the commonization is made based on the rule described above, first commonization is made with two groups of a group 2801 and a group 2802. Separately from the above, it is assumed that second commonization is made with three groups of the group 2802, a group 2803, and a group 2804. In this case, it is understood that the common group 2802 is included in each of commonized groups. In this case, it is also possible to perform the commonization with four groups of the group 2801, the group 2802, the group 2803, and the group 2804 by further commonizing the first commonization and the second commonization.

Accordingly, it is possible to perform the processing in the first commonization and the processing in the second commonization in one piece of processing. In this manner, in a case where a rule is already registered, when a rule having the same input as the registered rule is registered, it is possible to commonize the rules by increasing an influence range at the time of the rule registration. As a result, it is possible to further reduce the processing by that amount.

The information processing method described in the embodiment may be realized by causing a computer such as a personal computer or a workstation to execute a program prepared in advance. The information processing program is recorded in a computer-readable recording medium such as hard disk, flexible disk, compact disk (CD)-ROM, magneto-optical disk (MO), digital versatile disk (DVD), flash memory, or Universal Serial Bus (USB) memory and is executed by being read from the recording medium by the computer. The information processing program may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
one or more memories; and
one or more processors coupled to the one or more memories and the one or more processors configured to
execute a first process by using first input information for a first terminal,
perform first output of a first execution result generated by the first process executed by using the first input information,
judge whether the first output of the first execution result is registered in relational information in which an output destination of an execution result and a copy destination of the execution result are associated with each other,
when judging that the first output of the first execution result is registered in the relational information, copy the first output of the first execution result to the copy destination of the execution result,
in response to a received request to execute the first process by using second input information for a second terminal,
determine that the second terminal and the first terminal belong to a first group and that the first execution result is registered in the relational information, and perform second output of the first execution result by using the relational information in which the first output of the first execution result is copied, or
determine that either the second terminal and the first terminal belong to different groups or that the first execution result is not registered in the relational information, and execute the first process by using the second input information for the second terminal.

2. The information processing apparatus according to claim 1, wherein the second output includes invalidating the first process to be executed by using the second input information.

3. The information processing apparatus according to claim 1, wherein the first execution result is stored in the one or more memories as an execution result of the first process for a third terminal belonging to the first group.

4. The information processing apparatus according to claim 3, wherein the one or more processors are configured to, by referring to the one or more memories, perform third output of the first execution result in response to receiving another request of the first process to be executed by using third input information for the third terminal.

5. The information processing apparatus according to claim 1, wherein the one or more processors are configured to determine whether the first terminal and the second terminal belong to the first group in accordance with position information of the first terminal and position information of the second terminal.

6. A computer-implemented information processing method comprising:
executing a first process by using first input information for a first terminal;
first outputting a first execution result generated by the first process executed by using the first input information;
judging whether the first outputting is registered in relational information in which an output destination of an execution result and a copy destination of the execution result are associated with each other;
when judging that the first outputting of the first execution result is registered in the relational information, copying the first outputting to the copy destination of the execution result;
in response to a received request to execute the first process by using second input information for a second terminal,
determining that the second terminal and the first terminal belong to a first group and that the first execution result is registered in the relational information, and performing second outputting of the first execution result by using the relational information in which the first outputting of the first execution result is copied, or
determining that either the second terminal and the first terminal belong to different groups or that the first execution result is not registered in the relational information, and executing the first process by using the second input information for the second terminal.

7. The information processing method according to claim 6, wherein the second outputting includes invalidating the first process to be executed by using the second input information.

8. The information processing method according to claim 6, wherein the first execution result is stored in a storage device as an execution result of the first process for a third terminal belonging to the first group.

9. The information processing method according to claim 8, further comprising: by referring to the storage device, third outputting of the first execution result in response to receiving another request of the first process to be executed by using third input information for the third terminal.

10. The information processing method according to claim 6, further comprising: determining whether the first terminal and the second terminal belong to the first group in accordance with position information of the first terminal and position information of the second terminal.

11. A non-transitory computer-readable medium storing instructions executable by one or more computers, the instructions comprising:
one or more instructions for executing a first process by using first input information for a first terminal;
one or more instructions for first outputting a first execution result generated by the first process executed by using the first input information;
one or more instructions for judging whether the first outputting is registered in relational information in which an output destination of an execution result and a copy destination of the execution result are associated with each other;
when judging that the first outputting is registered in the relational information, one or more instructions for copying the first outputting to the copy destination of the execution result;
in response to a received request to execute the first process by using second input information for a second terminal,
one or more instructions to determine that the second terminal and the first terminal belong to a first group and that the first execution result is registered in the relational information, and perform second output of the first execution result by using the relational information in which the first output of the first execution result is copied, and one or more instructions to determine that either the second terminal and the first terminal belong to different groups or that the first execution result is not registered in the relational information, and execute the first process by using the second input information for the second terminal.

\* \* \* \* \*